United States Patent
Thrap et al.

(10) Patent No.: US 7,440,258 B2
(45) Date of Patent: Oct. 21, 2008

(54) THERMAL INTERCONNECTS FOR COUPLING ENERGY STORAGE DEVICES

(75) Inventors: Guy C. Thrap, Del Mar, CA (US); James L. Borkenhagen, Spring Valley, CA (US); Mark Wardas, Carlsbad, CA (US); Adrian Schneuwly, Eichenweg (CH); Philippe Lauper, Ch des Rochettes (CH)

(73) Assignee: Maxwell Technologies, Inc., San Diego, CA (US)

( * ) Notice: Subject to any disclaimer, the term of this patent is extended or adjusted under 35 U.S.C. 154(b) by 360 days.

(21) Appl. No.: 11/219,438

(22) Filed: Sep. 2, 2005

(65) Prior Publication Data

US 2006/0203429 A1    Sep. 14, 2006

Related U.S. Application Data

(60) Provisional application No. 60/690,255, filed on Jun. 14, 2005, provisional application No. 60/662,113, filed on Mar. 14, 2005, provisional application No. 60/705,385, filed on Aug. 4, 2005.

(51) Int. Cl.
*H01G 9/00*    (2006.01)

(52) U.S. Cl. .................. 361/502; 361/503; 361/504; 361/508; 361/512

(58) Field of Classification Search ............... 361/502, 361/503–504, 508, 510, 512, 516–519, 523–525, 361/532–534, 537, 538
See application file for complete search history.

(56) References Cited

U.S. PATENT DOCUMENTS

| | | | | |
|---|---|---|---|---|
| 5,077,634 A | * | 12/1991 | Shirata et al. | 361/502 |
| 5,798,906 A | * | 8/1998 | Ando et al. | 361/520 |
| 5,850,331 A | * | 12/1998 | Matsumoto et al. | 361/502 |
| 6,064,563 A | * | 5/2000 | Yamada et al. | 361/521 |
| 6,201,686 B1 | * | 3/2001 | Hiratsuka et al. | 361/502 |
| 6,205,034 B1 | * | 3/2001 | Zayatz | 361/824 |
| 6,327,137 B1 | * | 12/2001 | Yamamoto et al. | 361/517 |
| 6,466,429 B1 | * | 10/2002 | Volfkovich et al. | 361/502 |

* cited by examiner

*Primary Examiner*—Nguyen T. Ha
(74) *Attorney, Agent, or Firm*—Hensley Kim & Holzer, LLC

(57) ABSTRACT

A thermally fitted interconnect couples energy storage cells without the use of additional materials of fasteners. Variations of the interconnect can be used to facilitate fitting of multiple energy storage cell with multiple cell to cell spacings in a rapid and inexpensive manner.

5 Claims, 37 Drawing Sheets

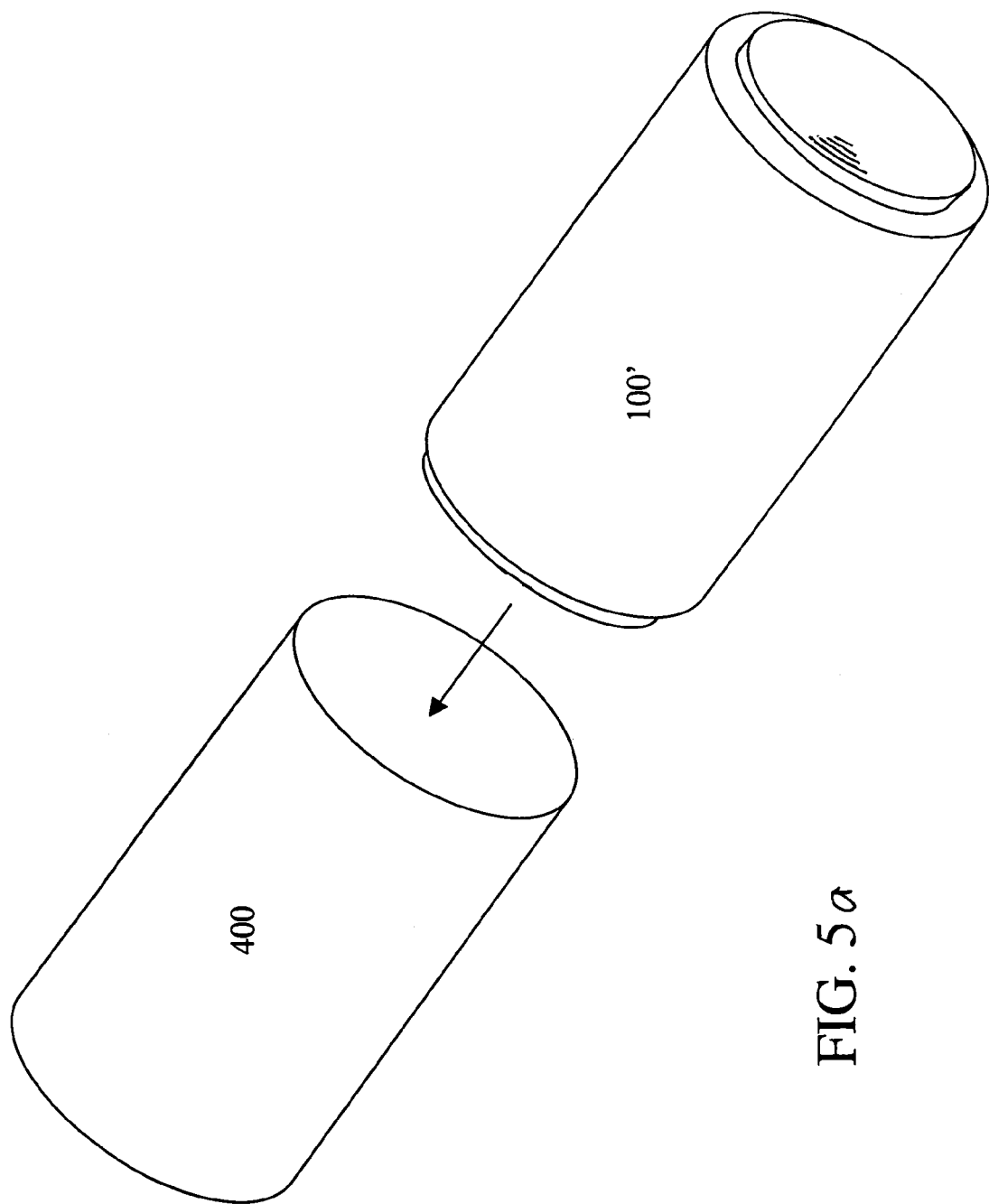

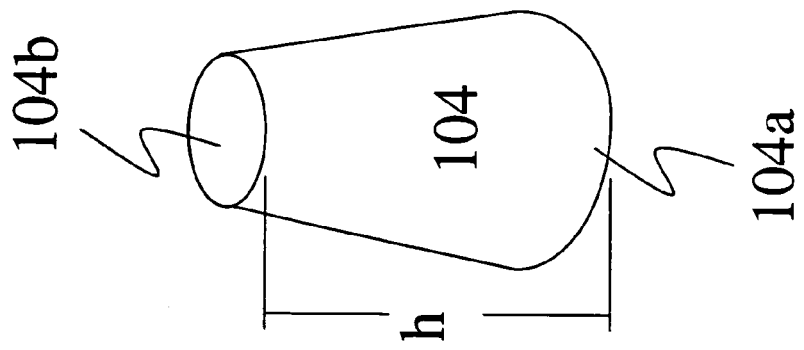
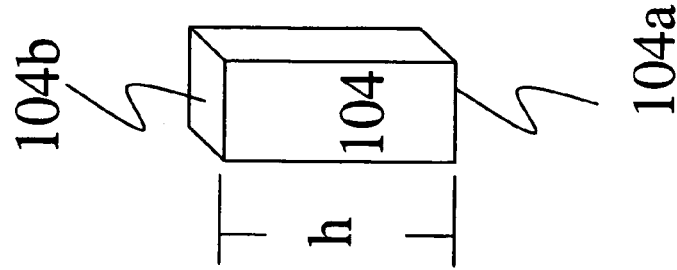
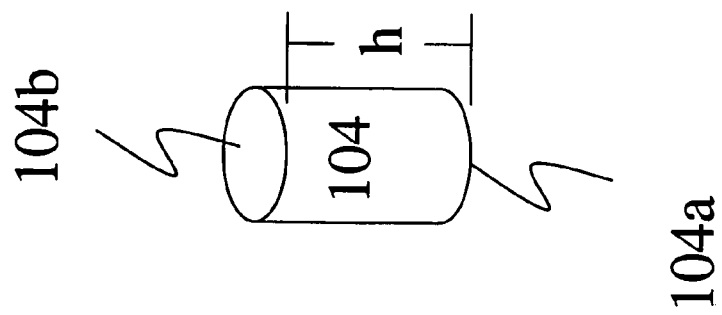
FIG. 28

Fig. 33
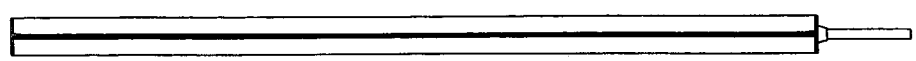
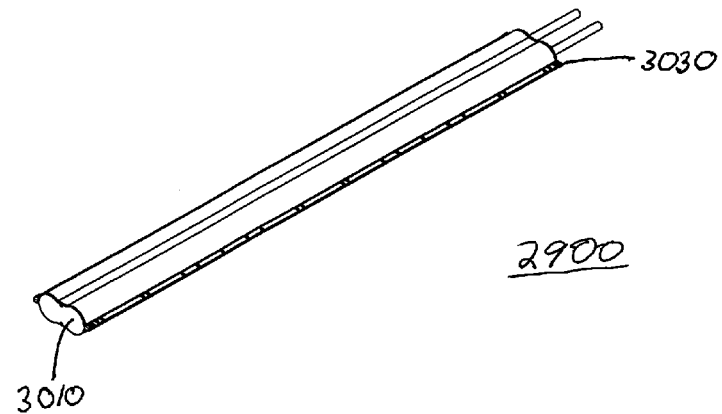
2900
3030
3010
Fig. 34

THERMAL INTERCONNECTS FOR COUPLING ENERGY STORAGE DEVICES

RELATED APPLICATIONS

This Application is related and claims priority to commonly assigned Provisional Application 60/690,255, filed Jun. 14, 2005, Provisional Application 60/662,113, flied Mar. 14, 2005, and Provisional Application 60/705,385, filed Aug. 4, 2005 which are incorporated herein by reference.

FIELD OF THE INVENTION

The present invention generally relates to energy storage devices. More specifically, the invention relates to fabrication of electrochemical double layer capacitor cells and multi-cell modules.

BACKGROUND

Important characteristics of electrical energy storage devices include energy density, power density, maximum charging rate, internal leakage current, equivalent series resistance (ESR), and durability, i.e., the ability to withstand multiple charge-discharge cycles. For a number of reasons, electrochemical double layer capacitors, also known as supercapacitors and ultracapacitors, are gaining popularity in many energy storage applications. The reasons include availability of double layer capacitors with high power densities (in both charge and discharge modes), and with energy storage densities approaching those of conventional rechargeable cells.

Double layer capacitors use electrodes immersed in an electrolyte (an electrolytic solution) as their energy storage element. Typically, a porous separator immersed in and impregnated with the electrolyte ensures that the electrodes do not come in contact with each other, preventing electronic current flow directly between the electrodes. At the same time, the porous separator allows ionic currents to flow between the electrodes in both directions. As discussed below, double layers of charges are formed at the interfaces between the solid electrodes and the electrolyte. Double layer capacitors owe their descriptive name to these layers.

When electric potential is applied between a pair of electrodes of a double layer capacitor, ions that exist within the electrolyte are attracted to the surfaces of the oppositely-charged electrodes, and migrate towards the electrodes. A layer of oppositely-charged ions is thus created and maintained near each electrode surface. Electrical energy is stored in the charge separation layers between these ionic layers and the charge layers of the corresponding electrode surfaces. In fact, the charge separation layers behave essentially as electrostatic capacitors. Electrostatic energy can also be stored in the double layer capacitors through orientation and alignment of molecules of the electrolytic solution under influence of the electric field induced by the potential, but these effects are typically secondary in nature.

In comparison to conventional capacitors, double layer capacitors have high capacitance in relation to their volume and weight. There are two main reasons for these volumetric and weight efficiencies. First, the charge separation layers are very narrow. Their widths are typically on the order of nanometers. Second, the electrodes can be made from a porous material with very large effective surface area per unit volume. Because capacitance is directly proportional to the electrode area and inversely proportional to the widths of the charge separation layers, the combined effects of the large effective surface area and narrow charge separation layers result in capacitance that is very high in comparison to that of conventional capacitors of similar size and weight. High capacitance of double layer capacitors allows the capacitors to receive, store, and release large amounts of electrical energy.

As has already been mentioned, equivalent series resistance is also an important capacitor performance parameter. Time and frequency responses of a capacitor depend on the characteristic time constant of the capacitor, which is essentially a product of the capacitance and the capacitor's equivalent series resistance, or "RC product." To put it differently, equivalent series resistance limits both charge and discharge rates of a capacitor, because the resistance restricts the current that flows into or out of the capacitor. Maximizing the charge and discharge rates is important in many applications. In electric and hybrid automotive applications, for example, a capacitor used as the energy storage device powering a vehicle's engine has to be able to provide high instantaneous power during acceleration, and to receive bursts of power produced by regenerative braking. In internal combustion vehicles, the capacitor may power a vehicle's starter, which also requires high power output in relation to the size of the capacitor.

The internal resistance also creates heat during both charge and discharge cycles. Heat causes mechanical stresses and speeds up various chemical reactions, thereby accelerating capacitor aging. Moreover, the energy converted into heat is lost, decreasing the efficiency of the capacitor. It is therefore desirable to reduce the internal equivalent series resistance of double layer capacitor cells.

Individual double layer capacitors or other energy storage cells may be combined into modules in order to raise output voltage, increase energy capacity, or to achieve both of these ends. When cells are connected in series, the resistance of the inter-cell connections effectively adds to the cells' internal equivalent series resistance. Thus, it is desirable to reduce the resistance of the inter-cell connections within a module.

Different applications may require different output voltages of capacitor modules. Similarly, some applications may need higher energy capacity than other applications. Moreover, applications may impose different constraints with respect to module volume, dimensions, and weight. Thus, it may be desirable to construct modules of different sizes and configurations, both electrical and mechanical. Customized design and production, however, are generally expensive and time consuming. Therefore, it would be desirable to reduce complexity and cost of manufacturing modules of different sizes and configurations. Furthermore, it is sometimes desirable to allow end-users to customize their modules from standardized energy storage cells.

Because energy storage modules may be moved and placed in various positions, cells within a module may need to be fastened to other cells and to the module's enclosure, so that their movement within the module is restricted or eliminated altogether. It would be desirable to do this without unduly increasing module size or weight, and without impairing effective heat conductance within modules.

Additionally, it would be desirable to increase the structural rigidity of module enclosures, and the level of physical protection provided by the enclosures to the cells disposed within the enclosures.

Conduction of heat from individual cells within modules to module enclosures, and away from module enclosures, is also an important consideration in design of modules and multi-module assemblies. It would be desirable to facilitate heat conduction from internal module cells to the enclosures and away from the enclosures. It would also be desirable to facilitate cooling of multiple modules that are placed near each other. At the same time, it would be desirable not to increase the amount of space needed for a given number of modules.

SUMMARY

A need thus exists for energy storage cells, and particularly for electrochemical capacitor cells, with low equivalent series resistance, and for methods of making cells with low equivalent series resistance.

Another need exists for cell interconnection techniques and apparatus that lower resistance of inter-cell connections.

Still another need exists for configurable energy storage modules that use standardized energy storage cells. In particular, a need exists for customizable modules that can be expanded in one, two, or all three dimensions to accommodate different cell numbers and cell configurations, and that can be assembled from a relatively small number of standardized components with reduced number of fasteners.

A further need exists for means that restrict movement of cells within a module, yet do not unnecessarily increase the module's weight or size.

Additional needs exist for means for decreasing thermal resistance between individual cells of a multi-cell module to enclosure of the module, and for strong and light module enclosures that improve flow of air surrounding the modules.

Various embodiments of the present invention are directed to energy storage cells, modules of energy storage cells, and methods for making energy storage cells and multi-cell modules that satisfy one or more of these needs. One exemplary embodiment of the invention herein disclosed is a method of laser welding a cylindrical aluminum housing or aluminum collector plate to current collector foil of a jellyroll electrode assembly of a double layer capacitor. According to this method, indentations are made in the bottom portion of the housing and in the collector plate to decrease the laser power needed to weld the current collector foil to the bottom portion and to the collector plate. The jellyroll is inserted into the housing and then the collector plate is also inserted into the housing. Pressure is applied to the collector plate to compress ("scrunch") the protruding foil at the end segments of the jellyroll, thereby increasing the contact area between the inner surface of the bottom portion and one of the foil segments, and between the other segment and the inner surface of the collector plate.

A laser is then applied to the indentations in the bottom portion of the housing and in the collector portion to laser weld the current collector foil to the bottom portion and to the collector plate. The pattern of the laser application is such that the length of a laser weld along each indentation is longer than the length of the indentation. For example, the laser may be applied in a zig-zag pattern, significantly increasing the length of the laser weld. Longer laser welds tend to reduce the equivalent series resistance of the resulting capacitor. Longer laser welds also tend to enhance robustness of the contacts made between the current collector, housing, and collector plate.

In aspects of the invention, the laser is applied in a crisscross sequence, moving from a first indentation to a diagonally opposing indentation, thereby reducing the maximum temperature reached by certain points of the housing and the collector plate during the laser welding process.

Another exemplary embodiment of the invention herein disclosed is an electrochemical double layer capacitor cell that includes a jellyroll electrode assembly laser welded (1) to aluminum housing on one side, and (2) to a collector plate on the other side, using the laser welding method described above.

Yet another exemplary embodiment of the invention is a module including a plurality of energy storage cells within a configurable enclosure extendible (customizable) in one, two, or three dimensions. The cells may be interconnected by welding bus bars between their terminals.

In aspects of the invention, the configurable enclosure includes panels that interlock using tongue and groove connectors to create a slideable interference joint.

In aspects of the invention, panels and sections of the configurable enclosure are contoured along the surfaces of cylindrical cells inside the enclosure. Contouring tends to improve heat transfer from the internal cells of the module to the enclosure, increase structural rigidity of the panels, and enhance air flow on the outside of the enclosure.

Still another exemplary embodiment of the invention is a multi-cell module with a stabilizer for locating the module's cells and keeping the cells in place. The stabilizer may include a printed circuit ("pc") board or boards with attached components. The circuitry on the pc board or boards may be configured to provide one or more of the following non-exclusive functions: balance voltages of the cells, monitor the voltages, and monitor the temperature within the module.

In aspects of the invention, the stabilizer includes adhesive thermal pad material that electrically insulates printed circuit board traces and components from the module's enclosure and/or cells, while providing a low thermal resistance path to the enclosure of the module.

In aspects of the invention, the cells are thermally interconnected using a bus bar that may include voids that allow adjustable distances from cell to cell.

In aspects of the invention, a configurable enclosure can be assembled in any one of a plurality of form factors to fit the requirements of a particular application. Such assembly can be effectuated with a small number of standardized components very quickly and cheaply, but to be both reliable and robust.

In an embodiment, an apparatus for connecting to a terminal of a capacitor comprises an interconnect, the interconnect including one or more void formed therein, wherein the one or more void is definable by a shape that is smaller than a corresponding shape of a capacitor terminal the void is intended to be coupled to. The interconnect may be dimensioned to pass at least 1000 amperes of current. The interconnect may couple two capacitors together in a series connection. The interconnect may couple two capacitors together in an axially oriented string. The interconnect may have disposed thereon a thermal pad. The interconnect may be disposed within a substrate. The interconnect may comprise a staking hole for receiving a conductor.

In an embodiment, a system comprises at least one interconnect, the at least one interconnect having at least one void formed therein, the at least one void defined at a temperature by a first surface disposed at a first radius; and at least one energy storage device, the at least one energy storage device having at least one terminal, the at least one terminal defined at the temperature by a second surface disposed at a second radius, wherein at the same temperature the first radius is smaller than the second radius, and wherein at the same temperature the at least one terminal is disposed within the at least one void. The first radius may be substantially constant at points along the first surface. The first radius may vary at points along the first surface. The at least one terminal may be disposed within the void and coupled to the at least one interconnect without use of additional material or devices.

The at least one device may comprise a current carrying device, wherein current passes directly between the at least one terminal and the at least one interconnect. The current may be at least 2000 amps. The at least one device, the at least one interconnect, and the at least one terminal may comprise a self-supporting assembly over a temperature range of about −40 Celsius to +85 degrees Celsius. The at least one terminal and the at least one interconnect may comprise similar or same materials. The materials may comprise aluminum. The at least one terminal and the at least one interconnect may comprise dissimilar materials. In one embodiment, at a specified temperature the at least one device, the at least one terminal, and the at least one interconnect do not comprise a self-supporting assembly. The at least one device may comprise a double-layer capacitor. The at least one device may comprise a battery. The at least one interconnect may comprise one interconnect, wherein the at least one void comprises a plurality of voids, wherein the at least one device comprises a first and a second device, wherein a respective terminal of the first device is coupled to the interconnect within one of the plurality of voids, and wherein a respective terminal of the second device is coupled to the interconnect within one of the plurality of voids, whereby the first and second device can be coupled by the one interconnect at a plurality of terminal to terminal spacings. The at least one interconnect may comprise at least two interconnects, wherein the at least two interconnects are separated from each other and disposed within a substrate. The first surface may be defined by a height, the height having a top and a bottom, wherein at the bottom the first radius is larger than at the top.

One embodiment of using an interconnect comprises the steps of: providing an energy storage device, the device including a terminal having a first distance; providing an interconnect, the interconnect including a void having a surface defined by a second distance; subjecting the terminal and the interconnect to different temperatures; positioning the terminal within the void; and allowing the terminal and the interconnect to equilibrate to substantially the same temperature to from a bond between the surface and the terminal. In one embodiment, before subjecting the terminal and the interconnect to different temperatures, and before positioning the terminal within the void, at the same temperature the first distance is shorter than the second distance. The device may comprise a capacitor. At the same temperature, the device, the terminal, and the interconnect may comprise a self-supporting assembly. In one embodiment, 1000 amps of current passes through the terminal and the interconnect.

These and other features and aspects of the present invention will be better understood with reference to the following description, drawings, and appended claims.

BRIEF DESCRIPTION OF THE FIGURES

FIG. 5A represents a perspective view of the jellyroll of FIG. 3 and the housing of FIG. 4 prior to the jellyroll being inserted into the housing, in accordance with some aspects of the present invention;

FIG. 28 represents three different terminal configurations, in accordance with some aspects of the present invention;

FIG. 33 represents a side view of a longitudinal enclosure, in accordance with some aspects of the present invention;

FIG. 34 represents a perspective view of the longitudinal enclosure of FIG. 31, in accordance with some aspects of the present invention;

DETAILED DESCRIPTION

Figure 1:
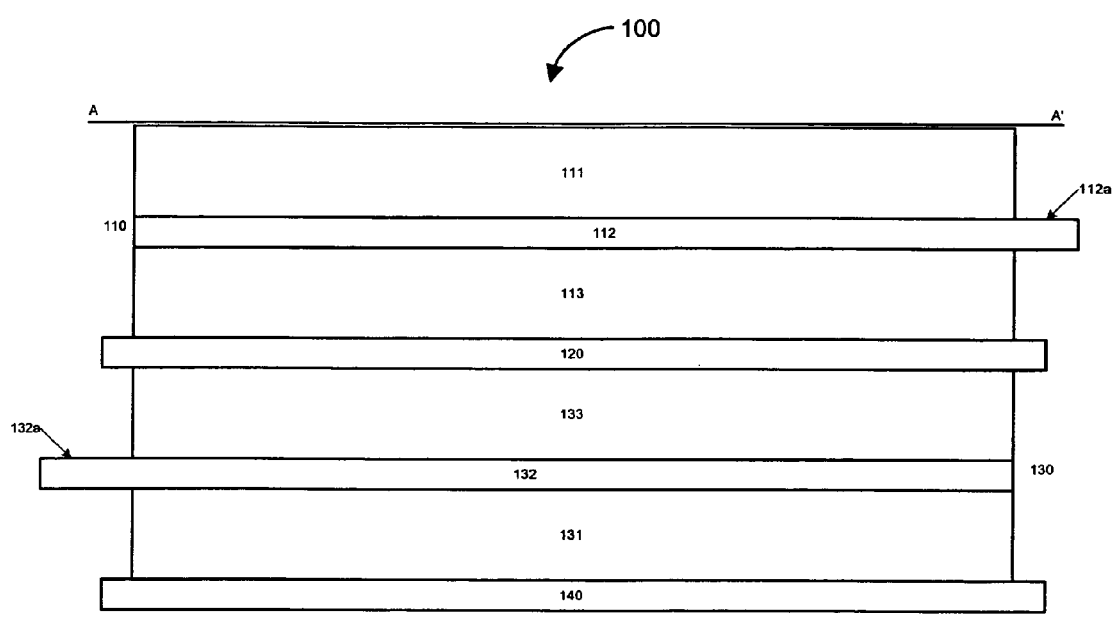
FIG. 1 represents a cross-section of an electrode sheet for use in an electrochemical double layer capacitor, in accordance with some aspects of the present invention.

In this document, the words "embodiment" and "variant" refer to particular apparatus, process, or article of manufacture, and not necessarily to the same apparatus, process, or article of manufacture. Thus, "an embodiment," "one embodiment," "some embodiments" or a similar expression used in one place or context can refer to a particular apparatus, process, article of manufacture, or a plurality thereof; the same or a similar expression in a different place can refer to a different apparatus, process, article of manufacture, or a plurality thereof. The expression "alternative embodiment" and similar phrases are used to indicate one of a number of different possible embodiments. The number of potential embodiments is not necessarily limited to two or any other quantity. Characterization of an embodiment as "exemplary" means that the embodiment is used as an example. Such characterization does not necessarily mean that the embodiment is a currently preferred embodiment; the embodiment may but need not be a currently preferred embodiment.

The word "module" means a plurality of interconnected electrical energy storage cells within a common enclosure. A "module" may further include one or more voltage monitoring circuits, voltage balancing circuits, temperature monitoring circuits, other electronic circuits, and still other components.

Other and further definitions and clarifications of definitions may be found throughout this document. The definitions are intended to assist in understanding this disclosure and the appended claims, but the scope and spirit of the invention should not be construed as strictly limited to the definitions, or to the particular examples described in this specification.

Reference will now be made in detail to several embodiments of the invention that are illustrated in the accompanying drawings. Same reference numerals are used in the drawings and the description to refer to the same or like parts or steps. Reference to numerals within the description may require reference to more than one Figure. The drawings may be in simplified form and not to precise scale. For purposes of convenience and clarity only, directional terms such as top, bottom, left, right, up, down, over, above, below, beneath, upper, lower, rear, and front may be used with respect to the accompanying drawings. These and similar directional terms should not be construed to limit the scope of the invention.

Referring more particularly to the drawings, FIG. 1 represents a cross-section of an electrode sheet 100 for use in an electrochemical double layer capacitor. The electrode sheet 100 includes a first electrode 110, a second electrode 130, a first porous separator layer 120 separating the first electrode 110 from the second electrode 130, and a second porous separator layer 140 adjacent to the side of the second electrode 130 that is opposite the side facing the first porous separator layer 120. The first electrode 110 includes a current collector 112 disposed between active electrode material films 111 and 113. Structure of the second electrode 130 is similar to that of the first electrode 110: a current collector 132 is disposed between active electrode material films 131 and 133.

Methods for making films of active electrode material, current collectors, porous separators, and for combining these elements into an electrode product such as the electrode sheet 100 are described in various patent documents of the assignee of the present invention, including, for example, the following U.S. patents and patent applications:

Nanjundiah et al., U.S. Pat. No. 6,627,252, entitled Electrochemical double layer capacitor having carbon powder electrodes;

Bendale, et al., U.S. Pat. No. 6,631,074, entitled Electrochemical double layer capacitor having carbon powder electrodes;

U.S. patent application entitled DRY PARTICLE BASED ADHESIVE ELECTRODE AND METHODS OF MAKING SAME, application Ser. No. 11/116,882, These commonly-assigned patents and patent applications are hereby incorporated by reference as if fully set forth herein, including all figures, tables, and claims.

In some embodiments, the current collectors 112 and 132 are made of metal foil, for example, aluminum foil. Note that each of the current collectors 112 and 132 is offset from the center of the electrode sheet 100, extending beyond the active electrode material films 111/113/131/133 and porous separators 120/140 on a different end of the electrode sheet 100. As represented in FIG. 1, the current collector 112 includes a segment 112a that extends on the right side of the electrode sheet 100; the current collector 132 includes a segment 132a that extends on the left side of the electrode sheet 100.

The electrode sheet 100 is rolled about a central axis, for example, an axis A-A' of FIG. 1, to form a "jellyroll" 100' in which the extending segments 112a and 132a are exposed on respective ends of the jellyroll.

Figure 2:
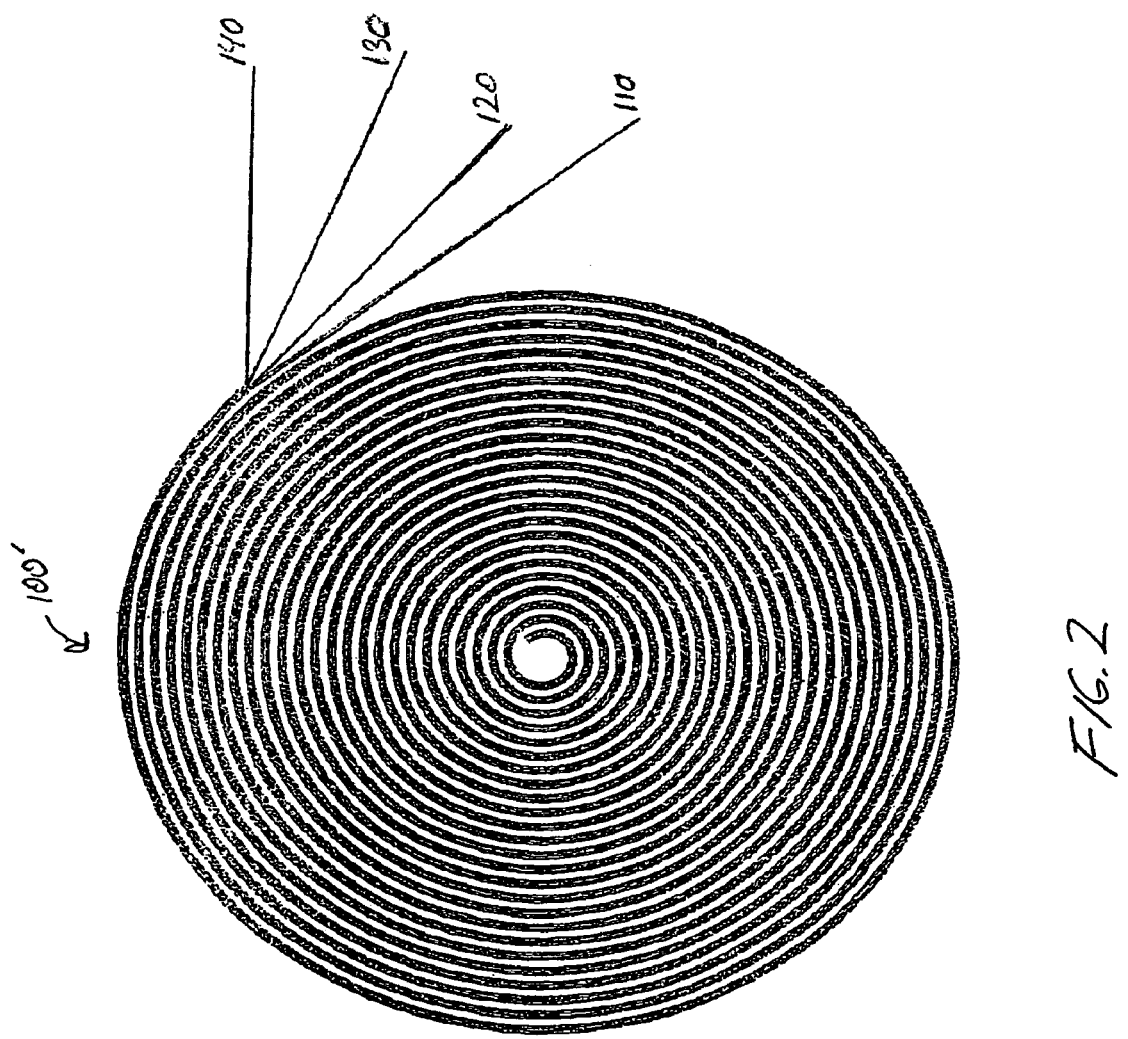
FIG. 2 represents a cross-section of a jellyroll made from the electrode sheet of FIG. 1, in accordance with some aspects of the present invention.

FIG. 2 illustrates a cross-section of a jellyroll 100' taken along a plane that is transverse to the axis A-A'. The extending segments 112a and 132a of the respective current collectors 112 and 132 provide points at which electrical contact with the current collectors may be made in the double layer capacitor built from the jellyroll 100'.

Figure 3:
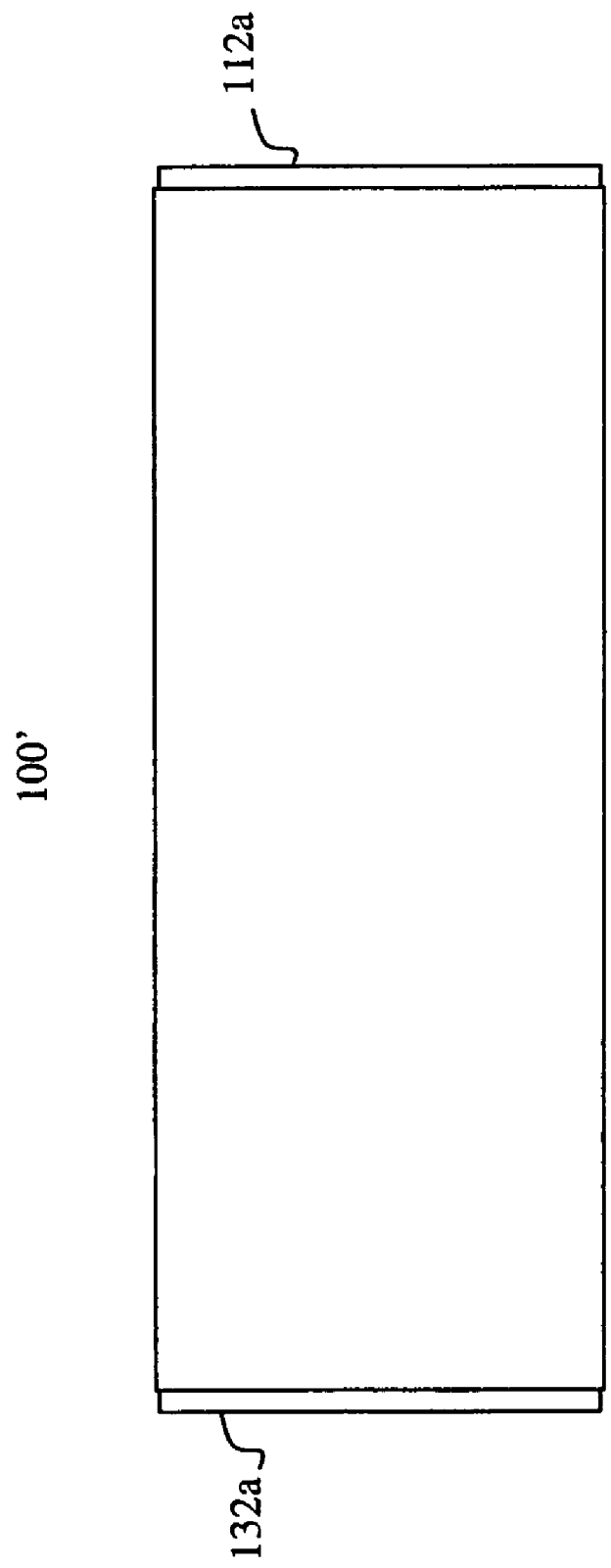
FIG. 3 represents a side view of the jellyroll of FIG. 2 prior to its use in a double layer capacitor, in accordance with some aspects of the present invention.

FIG. 3 represents a side view of the jellyroll 100' prior to its placement within a housing.

Figure 4:
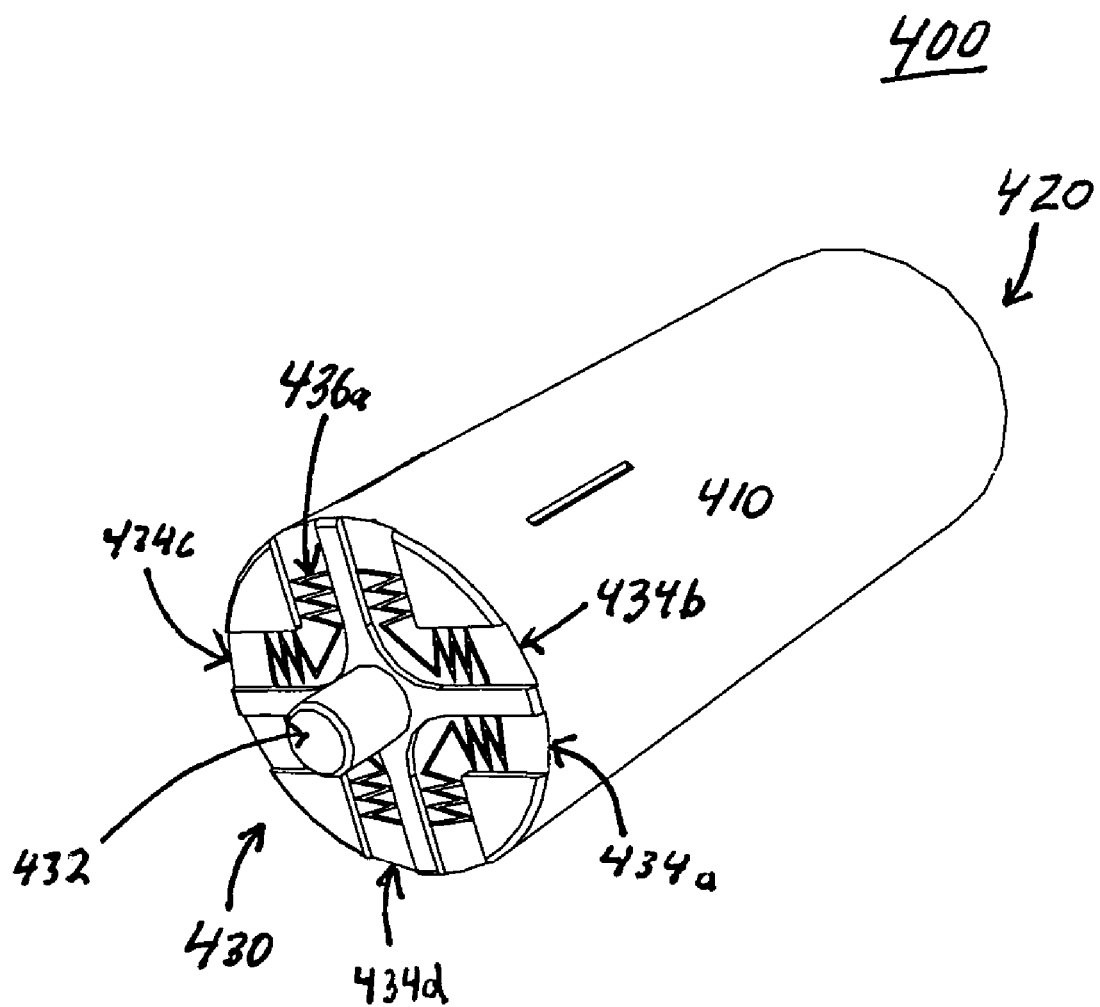
FIG. 4 represents a perspective view of an aluminum housing used in making an electrochemical double layer capacitor, in accordance with some aspects of the present invention.

FIG. 4 represents a perspective view of an aluminum housing (can) 400 capable of receiving the jellyroll 100'. As represented, the housing 400 includes a generally cylindrical body 410 with an open end 420 and a bottom portion 430. In some embodiments, the housing 400 is made from substantially pure aluminum, for example, 99 or 99.5 percent pure aluminum, and has a wall thickness of about 0.040 inch. Note an integral bottom terminal stub 432 extending outward from the bottom portion 430. The length and diameter of the terminal stub 432 may vary in different embodiments. The terminal stub 432 may be smooth, as in FIG. 4, or may be threaded. Other geometries of the terminal stub 432 also fall within the subject matter of the invention. The length of the stub may also vary according to intended use. Furthermore, some embodiments do not include an extending terminal stub; in such embodiments, the bottom end 430 and/or the cylindrical body 410 provide contact surfaces that serve the function of a terminal. As needed for electrical insulation, the housing 400 may have disposed about its outer surface a thin sleeve for providing electrical insulation against contact with other components in a subsequently assembled module.

Note further four indentations (or channels) 434a, 434b, 434c, and 434d on the exterior of the bottom portion 400. In various embodiments, fewer or more than four indentations are provided on the bottom portion of the housing. As is described in more detail below, the thickness of the bottom portion 440 is reduced in the indentations 434 to provide an area for laser welding the bottom portion 430 to one of the extending segments 112a or 132a of the jellyroll 100'. In an exemplary embodiment with 0.040 inch approximate thickness of the housing walls and of the bottom portion 430, wall thickness in the indentations 434 is reduced to approximately 0.025 inch. Because the wall thickness is reduced at the indentations 434, less laser power is needed to make low resistance laser welds between the bottom portion 430 and the extending segment in contact with it. In FIG. 4, application of a laser forms a zig-zag pattern 436a.

In some embodiments, the interior surfaces of the housing 400 are substantially smooth. In other embodiments, the interior surface of the bottom portion 430 includes, for example, one or more radial wedge-like ridges providing gripping and deformation forces that improve contact between the bottom portion and the extending segments of a jellyroll that is inserted into the housing. In some embodiments that include such ridges, opposing overlap between the indentations 434 on the exterior surface of the bottom portion 430 and the ridges on the interior surface of the bottom portion 430 is minimized or eliminated altogether.

Figure 5B:
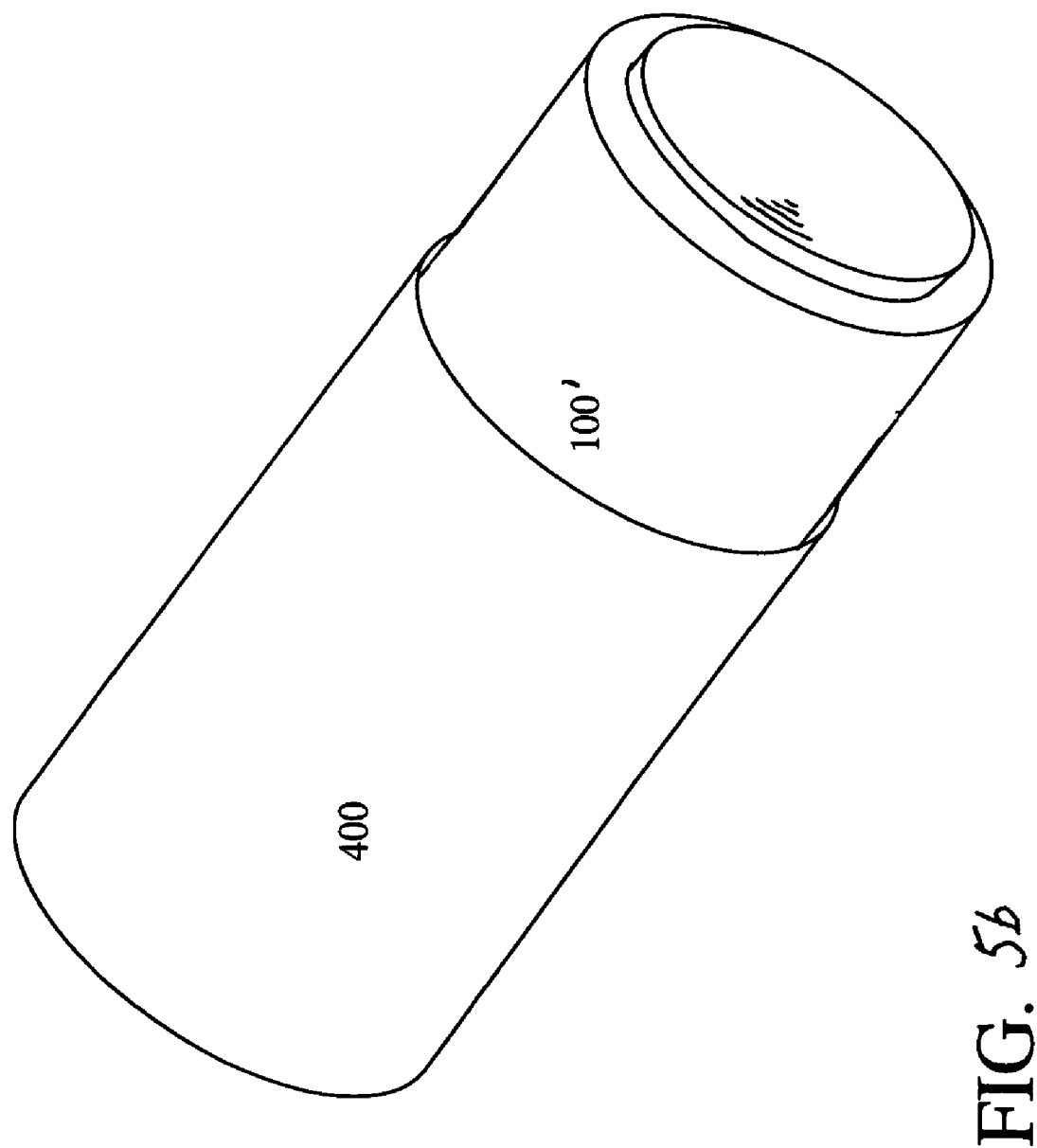
FIG. 5B represents a perspective view of the jellyroll of FIG. 3 being partially inserted into the housing of FIG. 4, in accordance with some aspects of the present invention.

FIG. 5a represents a perspective view of the jellyroll 100' and the housing 400 prior to the jellyroll 100' being inserted into the housing 400 through the open end 420. FIG. 5b represents a perspective view of the jellyroll 100' partially inserted into housing 400.

After jellyroll 100' is inserted into to housing 400, a force is applied to press the jellyroll 100' against the interior surface of the bottom portion 430. The applied pressure causes the aluminum foil of the extended segment that is in contact with the interior surface of the bottom portion 430 (e.g., the segment 112a) to "crunch," i.e., to squash in the axial direction, folding and compressing the protruding foil of the segment towards the center of the jellyroll 100'.

Figure 6:
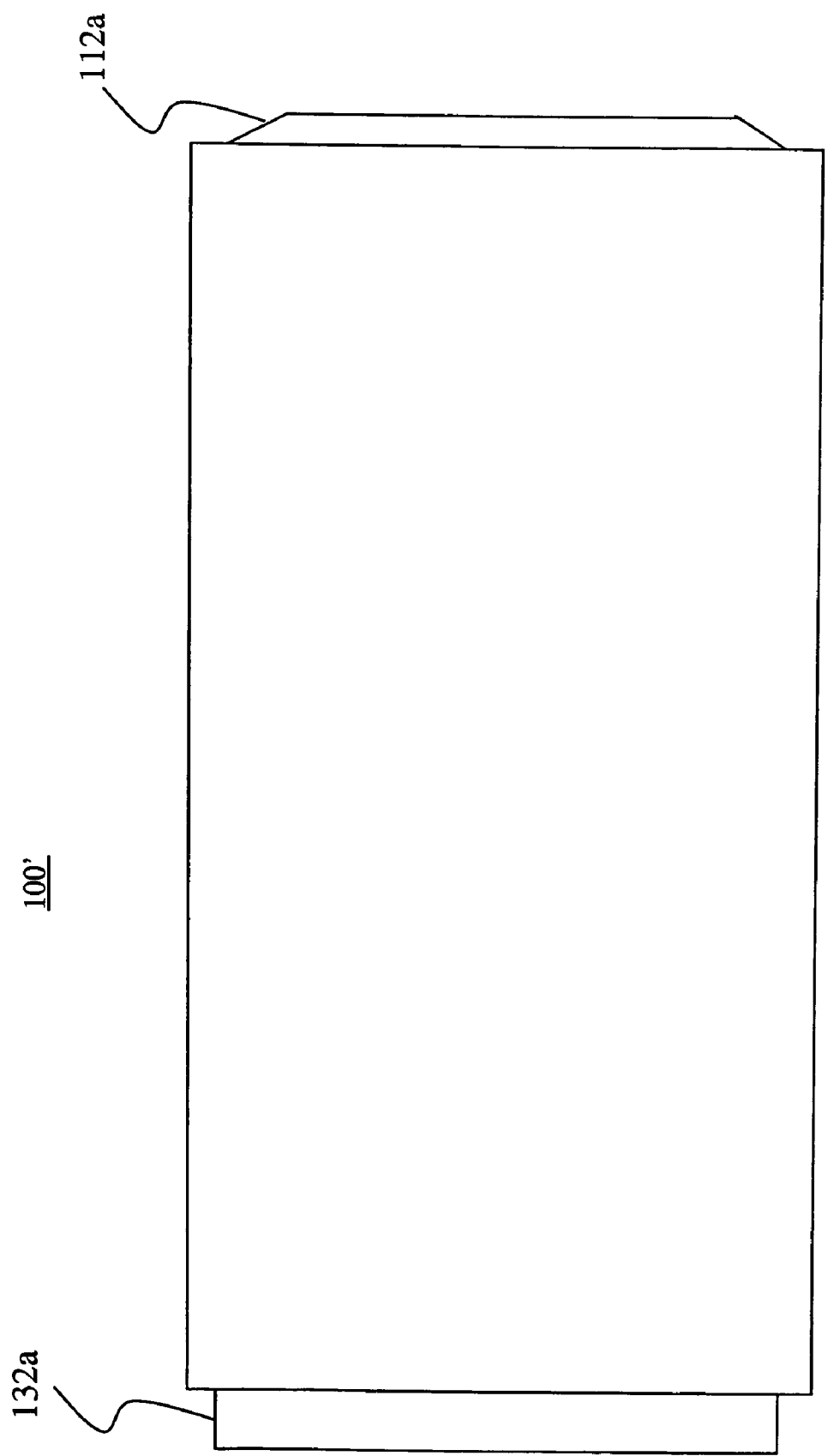
FIG. 6 represents a close-up view of a crunched extending segment of the jellyroll of FIG. 3, in accordance with some aspects of the present invention.

FIG. 6 represents a view of a jellyroll 100' after segment 112a is pressed against the interior surface of the bottom portion 430. When the segment 112a is pressed against the interior surface of the bottom portion, respective protruding foils are preferably bent and crushed toward the center of the jellyroll 100'. Segment 132a is shown to be unbent and uncrushed. Bending and crushing segment 132a may be performed before or during subsequent attachment of a collector plate or cover. Bending and crushing of the protruding foils at both or either end of the jellyroll 100' may be also performed in a step, wherein segments 112a and 132a are preprocessed in manner that prior to insertion into the housing they are both bent and/or crushed. It is identified that crushing of the protruding foils at segment 112a toward the center of the jellyroll 100' increases the contact area between the foil (current collector of the jellyroll 100') and the bottom portion 430.

In one embodiment, while the jellyroll 100' is pressed against the interior surface of the bottom portion 430, a laser beam is applied to the indentations 434 on the exterior surface of the bottom portion 430. The laser beam heats the housing 400 and the aluminum foil of the segment 112a in proximity to the points of the beam's application, welding the foil to the interior surface of the bottom portion 430. The laser weld thus formed improves the electrical contact between the housing 400 and the current collector 112. In comparison to a purely mechanical contact created by simply pressing the jellyroll 100' against the bottom portion 430, a laser welded contact generally (1) has lower resistance, and (2) is more robust and better capable of withstanding high currents, shock, vibration, and other stresses. It is identified because the contact area between current collector 112 and the bottom portion 430 was previously increased by bending and crushing of the segments 112, localized heat increases are better able to be avoided. Such heat increases can increase the likelihood of damage to the jellroll 100' and/or the housing 400 during laser welding.

It has been identified that a particular weld pattern formed by the laser during the welding operation can lower the contact resistance between the current collector of the jellyroll 100' and the housing 400. For example, by increasing the length of the laser weld, contact resistance may be reduced. However, there is only a limited amount of space within which to make such a weld pattern. It is identified that an increased length laser weld pattern can be provided when other than a straight line distance between the start and the ultimate end point of a laser weld is traversed by a laser beam. In the embodiment represented in FIG. 4, a laser weld forms a zig-zag pattern within indentations 434. In other embodiments, laser welding forms long oval shapes. Still other embodiments have welds of other shapes, for example, laser welds with non-linear geometries. It is understood that within the context of a laser weld pattern that is substantially non linear between a start and end point traversed by a laser beam, application of the laser may be in the form of pulses and, therefore, the laser weld pattern may be comprised of a discrete number of weld points that may be used to describe the non-linear pattern, zig-zag, oval, or otherwise.

In some embodiments, the length of each weld is at least two and a half times the length of a corresponding indentation within which it is made. In more specific embodiments, the length of the weld is at least three times the length of the corresponding indentation. In still more specific embodiments, the weld length is between about three and a half and five times the length of the corresponding indentation.

In some embodiments, laser welding of the indentations 434 is performed in a criss-cross sequence, moving from a first indentation to a diagonally opposing indentation. The criss-cross sequence tends to reduce the maximum temperature reached by certain points of the bottom portion 430 during the laser welding step, because end points of a laser weld within an indentation are not adjacent to start points in another indentation. For example, the laser may be applied to the indentations 434 in the following sequence: 434a, 434c, 434d, 434b; other sequences are also possible.

Welding in the criss-cross sequence may be extended to the case of more than four indentations. For example, when five indentations are present on the bottom portion, they may be processed in the following sequence: first, third, fifth, second, and fourth. This is similar to the recommended sequences for tightening lug nuts on an automobile wheel. When criss-cross sequences for laser welding are used it has been identified that start to finish welding time may be reduced. This effect is achieved because adjacent areas are not welded at substantially the same time, thereby eliminating the need to cool an area adjacent to an intended area to be welded.

In one embodiment, laser welding may be performed by providing two laser beams at the same time. In the case of four indentations, the two laser beams could be applied to corresponding opposed indentations, for example at 434a and 434c, and afterwards to indentations at 434b and 434d.

In one embodiment, after jellyroll 100' is inserted in the housing 400, a collector plate (or collector disk) is inserted into the housing 400 and onto the jellyroll. The collector plate may be inserted into the housing 400 following the laser welding of the jellyroll 100' to the bottom portion 430. In alternative embodiments, the collector plate may be inserted into the housing 400 before welding of the jellyroll 100' at the indentations 434. Indeed, the collector plate may be pushed against the jellyroll 100' to press the jellyroll 100' against the bottom portion 430 during the crunching and welding steps. Applying pressure on the collector plate crunches not only the extended segment 112a of the jellyroll 100' that is in contact with the bottom portion 430, but also the extended segment 132a that is in contact with the collector plate.

Figure 7A:
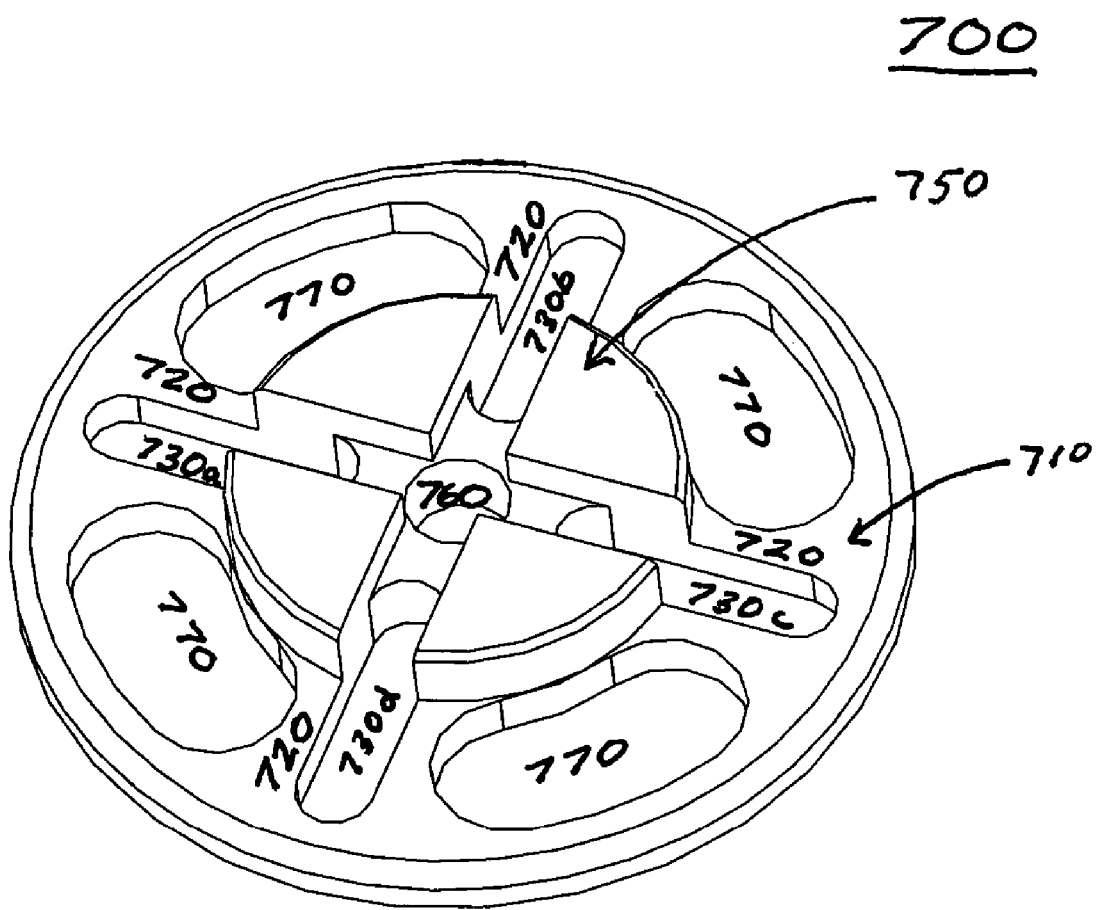
FIGS. 7A and 7B represent perspective top and bottom views, respectively, of a collector plate used in an electrochemical double layer capacitor, in accordance with some aspects of the present invention.
Figure 7B:
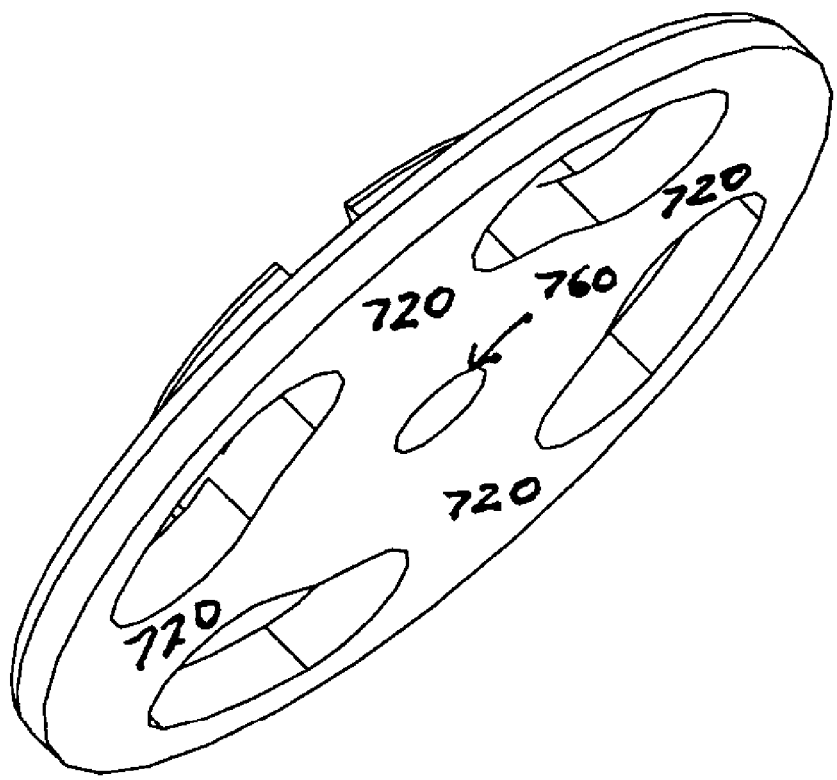

FIGS. 7A and 7B represent perspective top and bottom views, respectively, of a collector plate 700 of a representative embodiment of a double layer capacitor. In this embodiment, the collector plate 700 is made from the same material as the housing 400. Thus, the collector plate 700 may have same temperature expansion coefficient as the housing 400.

Figure 8:
FIG. 8 represents a side cross-section of a collector insulator gasket for preventing contact between the collector plate, in accordance with some aspects of the present invention.

The collector plate 700 includes a circular lower portion 710 and a circular upper portion 750. The outside diameter of the lower portion 710 is slightly smaller than the inside diameter of the housing 400 in order to allow a collector insulator gasket 800, which is shown in FIG. 8 to be placed onto the lower portion 710. As a person skilled in the art would understand after perusal of this description and the attached Figures, the housing 400 and the collector plate 700 are at opposite polarity.

FIG. 8 represents a side cross-sectional view of a collector insulator gasket 800 for preventing electrical contact between the collector plate 700 and the housing 400. Insulator gasket 800 has a generally disc shaped geometry with an inner void and a peripheral geometry that in a cross-section can be described as comprising an "L" shape. The collector insulator gasket may be made, for example, from polypropylene or Tefzel®. Other electrical insulators may also be used for this purpose.

Collector plate 700 comprise four indentations 730a, 730b, 730c, and 730d on the top surface of spoke members 720 formed on the lower portion 710. The spoke members 720 extend radially from the center hole 760. A plurality of slots 770 are formed between the spoke members 720. In the illustrated embodiment, there are four spoke members 720 and four slots 770. A different number of these elements may be found in various alternative embodiments. The thickness of the lower portion 710 is reduced in the indentations 730 to provide an area for laser welding the collector plate 700 to the extending segment 132a of the jellyroll 100'. In an exemplary embodiment, the thickness at the indentations 730 is reduced to approximately 0.025 inch. Because of the reduced thickness, less laser power is needed to make a low resistance laser weld between the collector plate 700 and the extending segment 132a of the jellyroll 100' in contact with it.

The laser welding pattern used on the current collector 700 may be the same or similar to the pattern used on the bottom portion 430. For example, a zig-zag pattern may be used to increase the length of the laser welds and thereby reduce the contact resistance between the current collector of the jellyroll 100' and the collector plate 700. In some embodiments, the length of each laser weld is at least two and a half times the length of the corresponding indentation 730 as measured along the center-line of the indentation 730. In more specific embodiments, the length of the weld is at least three times the length of the corresponding indentation 730. In still more specific embodiments, the weld length is between about three and a half and five times the length of the corresponding indentation 730.

A criss-cross welding sequence may be used to laser weld the collector plate 700 to the extended segment 132a of the jellyroll 100'. As in the case of laser welding the bottom portion 430, a criss-cross welding sequence used on the collector plate 700 tends to reduce the maximum temperature of certain areas.

Diameter of the upper portion 750 of the collector plate 700 is smaller than the diameter of the lower portion 710. In the illustrated embodiment, the diameter of the upper portion 750 is approximately one half of the diameter of the lower portion 710, although other diameter ratios may also be used.

In some embodiments, pressure is applied to the collector plate 700 so as to squeeze the jellyroll 100' and crunch the extended segments 112a and 132a, and then the housing 400 is compressed radially in the inward direction to form a circular bead above the lower portion 710 of the collector plate 700 and the collector insulator gasket 800.

Figure 9:
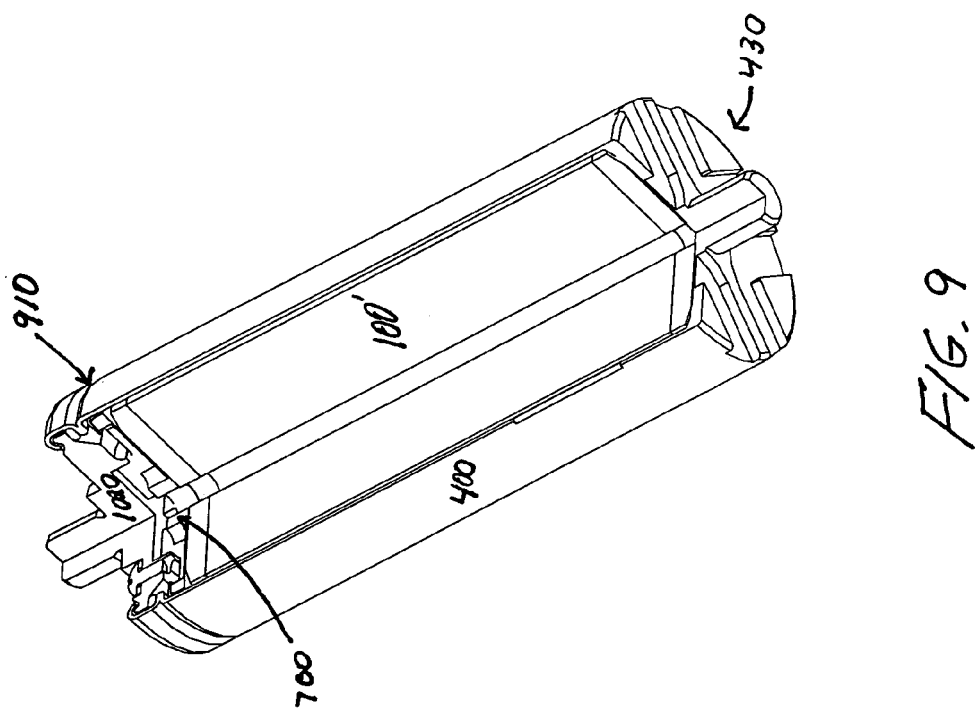
FIG. 9 represents a cutaway view of a housing, in accordance with some aspects of the present invention.

FIG. 9 represents a cutaway view of a housing 400 containing a jelly-roll 100', a collector plate 700, and a lid member 1020. A shown, housing 400 comprises a bead 910 formed above collector plate 700. The interior diameter of the housing 400 is decreased at the bead 910 in order to hold the collector plate 700 in the position such that pressure continues to be applied to the jellyroll 100'. In the illustrated embodiment, laser welding is performed on the bottom portion 430 and on the collector plate 700, as has been described above. Either the bottom portion 430 or the collector plate 700 may be welded first.

Figure 10:
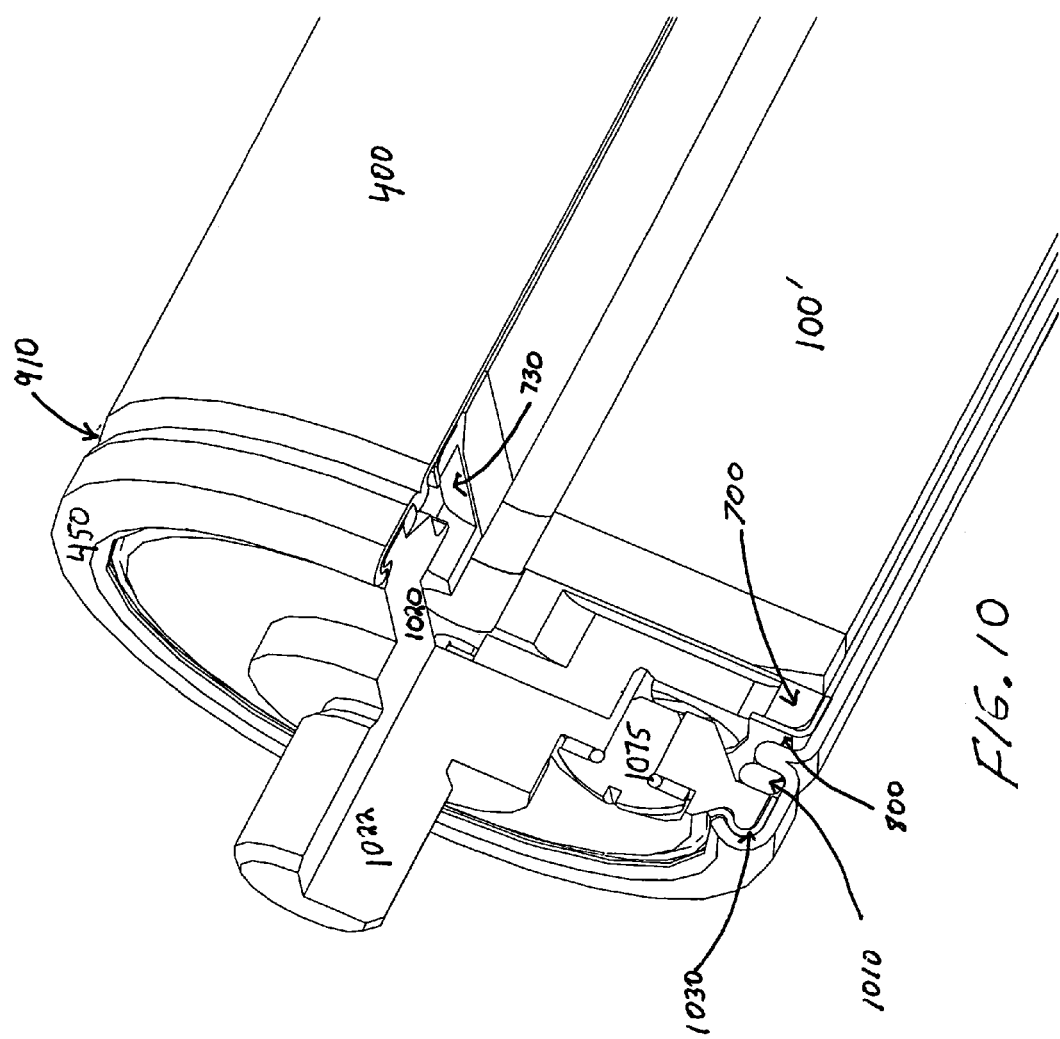
FIG. 10 represents a close up of the beaded housing of FIG. 9 with an O-ring, a lid member, and a lid insulator gasket placed and seated on top of the collector plate.

FIG. 10 represents a close up view of the beaded housing 400 with an O-ring 1010, a lid member 1020, and a lid insulator gasket 1030 placed and seated on top of the collector plate 700.

Figure 11:
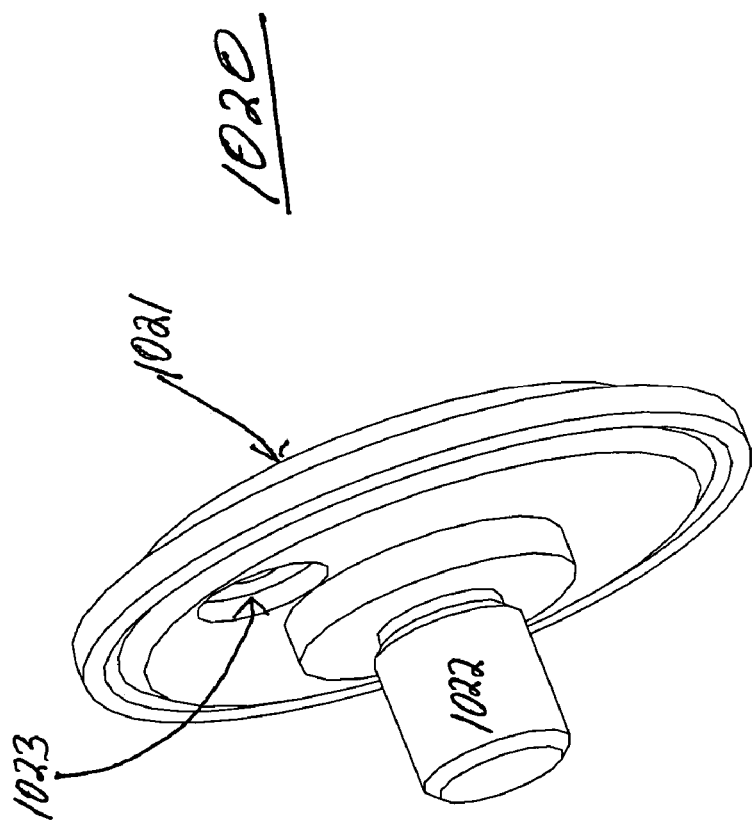
FIG. 11 represents a top perspective view of the lid member that appears in FIG. 10, in accordance with some aspects of the present invention.
Figure 12:
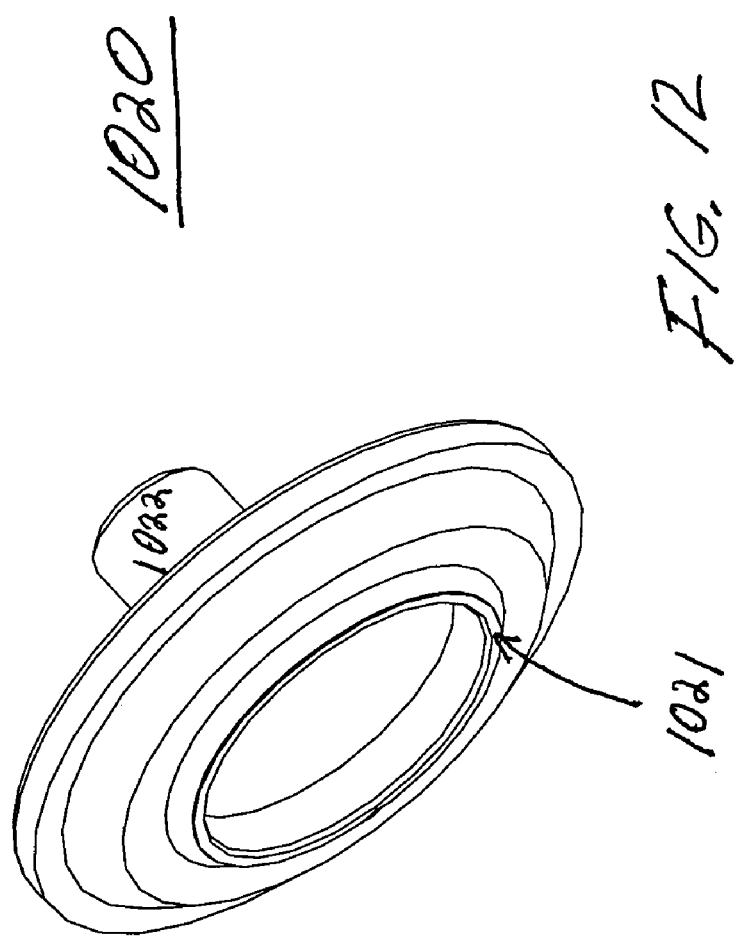
FIG. 12 represents a bottom perspective view of the lid member that appears in FIG. 10, in accordance with some aspects of the present invention.

FIGS. 11 and 12 represent the lid member 1020. The lid member 1020 includes a circular extending bottom portion 1021, integral top terminal stub 1022, and fill hole 1023.

In some embodiments, the inner diameter of the circular extending portion 1021 is slightly smaller than the outer diameter of the upper portion 750 of the collector plate 700. In these embodiments, the lid member 1020 is heated, for example, heated in an oven or using an induction heating technique. When heated, the lid member 1020 expands and the inner diameter of the circular extending portion 1021 increases. The lid member 1020 can then be slipped and seated onto the upper portion 750 of the collector plate 700, as illustrated in FIG. 10. After the lid member 1020 cools down, it becomes securely attached to the collector plate 700.

Advantageously, the lid member 1020 may be made from the same material as the collector plate 700 (e.g., aluminum) so that the two components expand and contract at the same rate, remaining securely attached to each other throughout a wide temperature range.

The function of the lid insulator gasket 1030 is similar to that of the collector insulator gasket 800; it prevents electrical contact between the lid member 1020 and the housing 400. As a person skilled in the art would understand after perusal of this description and the attached Figures, the housing 400 and the lid member 1020 are connected to the opposite terminals of the double layer capacitor made with these components. The lid insulator gasket 1030 may also help to form a seal between the housing 400 and the lid member 1020. The lid insulator gasket 1030 may be made, for example, from polypropylene, Tefzel®, or another electrically insulating material. In some embodiments, the lid insulator gasket 1030 and the collector insulator gasket 800 are made from the same material, have the same dimensions, and therefore are interchangeable.

After the lid member 1020 is seated on and attached to the collector plate 700, an upper portion 450 of the housing 400 is crimped to form a crimp seal around the top of the housing 400. FIG. 10 shows show a cutaway view of the housing 400 after a crimp seal is formed by lip 450. The crimp seal secures the lid member 1020 (as well as various other components discussed above) within the housing 400. Electrolytic solution may then be introduced into the housing 400 through the fill hole 1023 in the lid member 1020. After the housing 400 is filled with the electrolytic solution, the fill hole 1023 is closed with a plug 1075. The electrolytic solution is not shown separately, but it should be understood that the solution permeates the jellyroll 100' and the space around it within the housing 400. In this manner an electrochemical double layer capacitor may be obtained.

Electrical energy storage cells, such as the capacitor 1300, may be combined into multi-cell modules. Within the modules, the cells may be coupled in parallel, in series, or both in parallel and in series. Interconnections between individual cells of a module may be effected by bus bars that attach to the cells' terminals.

Figure 13:
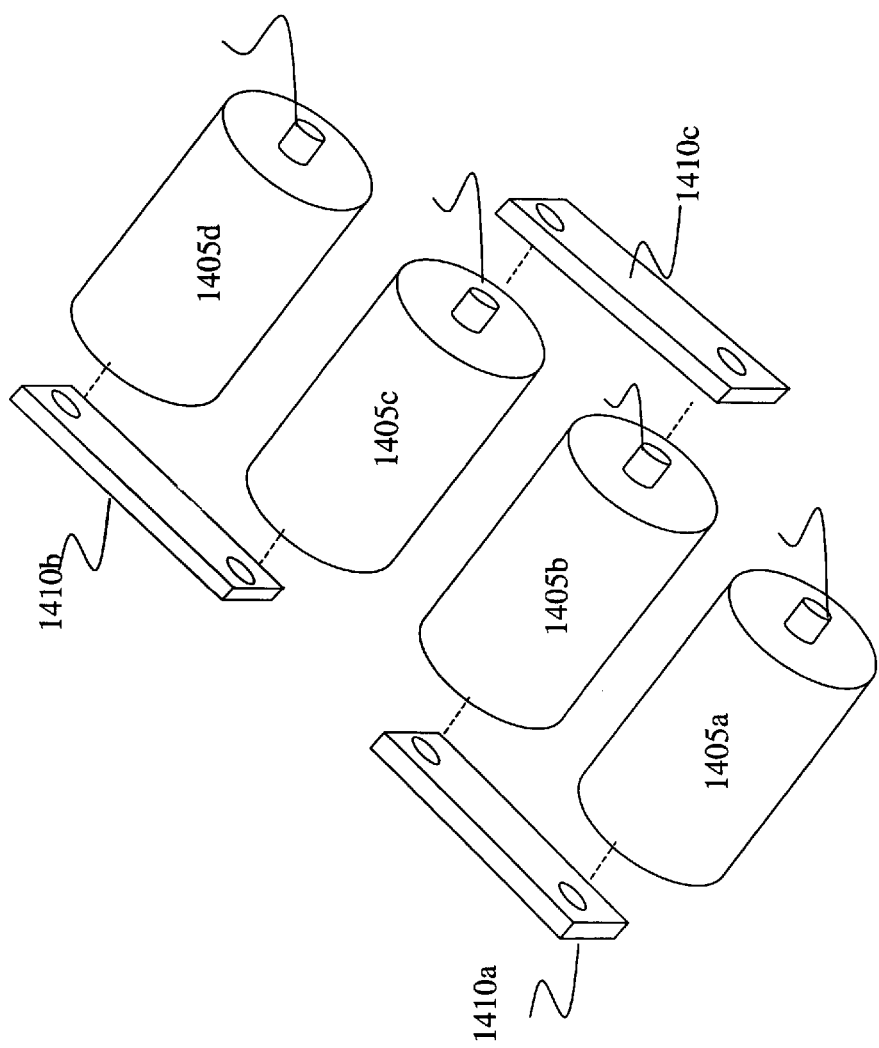
FIG. 13 represents a four capacitor cell combination that includes capacitor cells interconnected in series by bus bars, in accordance with some aspects of the present invention.

FIG. 13 represents an exploded view of four capacitor combination 1400 that includes capacitor cells 1405a-1405d interconnected in series by bus bars 1410a-c. Only four interconnected capacitor cells are shown, but it is understood that fewer or more cells could be interconnected, in series and/or in parallel. Each bus bar comprises, at each end, a void that is placed over a respective terminal of a cell. In one embodiment, the void is dimensioned to be larger in geometry or radius than the terminal, but as will be discussed later below, the void may have other dimensions. In one embodiment, at the periphery of the void, the bus bar may be laser welded to a capacitor terminal that is inserted into the void. The laser weld provides a low resistance path through which large currents can pass between capacitors without generating excessive heat. Interconnection of a bus bar to a terminal using other than laser welding or without additional materials is discussed further below.

Bus bar 1410a connects the cells 1405a and 1405b, bus bar 1410c connects cells 1405b and 1405c, and bus bar 1410b connects the cells 1405c and 1405c. In one embodiment, the bus bars may be used to connect positive and negative terminals of the cells in a series capacitor configuration. In one embodiment, the bus bars may be used to connect terminals of cells to effectuate a parallel capacitor configuration.

The bus bars 1410 shown in FIG. 13 allow only one inter-cell spacing. In other embodiments, bus bars that provide variable cell-to-cell spacing may be used.

Figure 14:
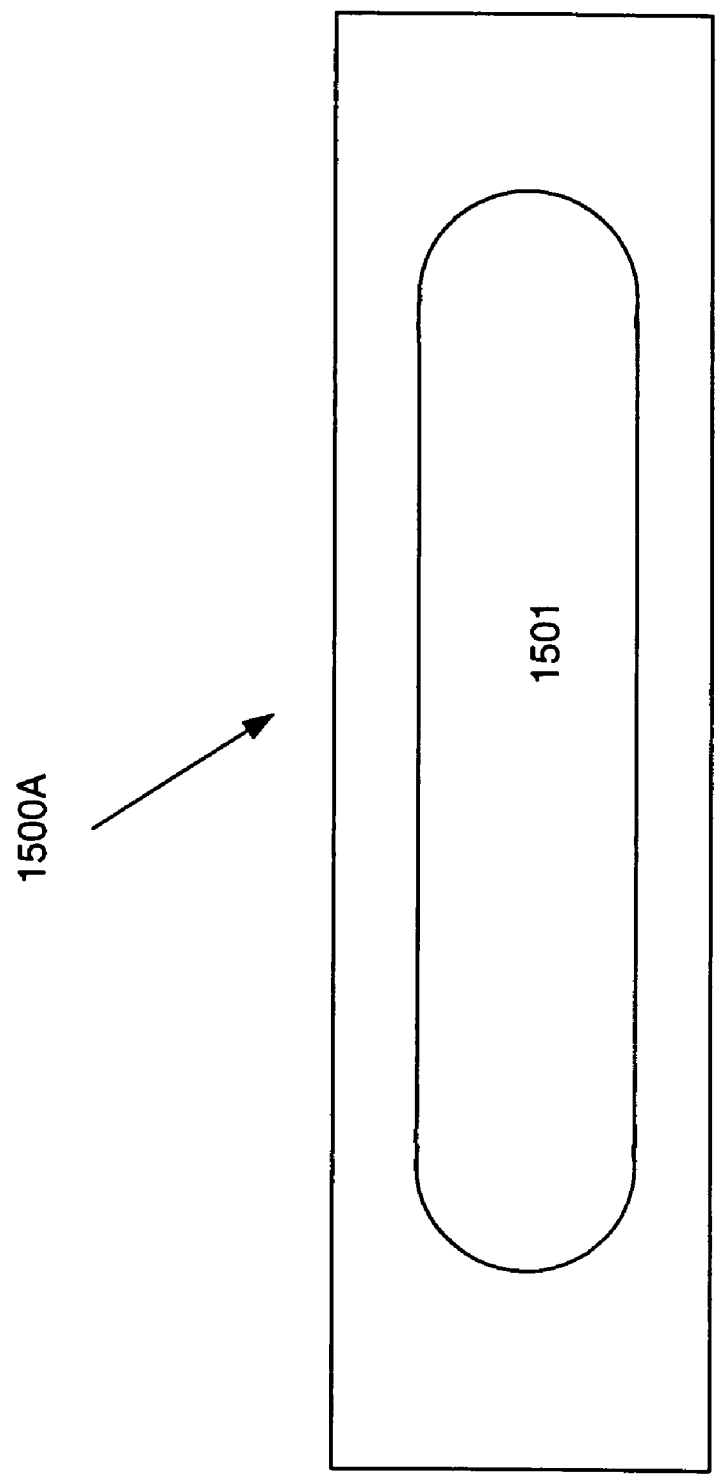
FIGS. 14 and 15 represent two variable-spacing bus bars for interconnecting energy storage cells, in accordance with some aspects of the present invention.
Figure 15:
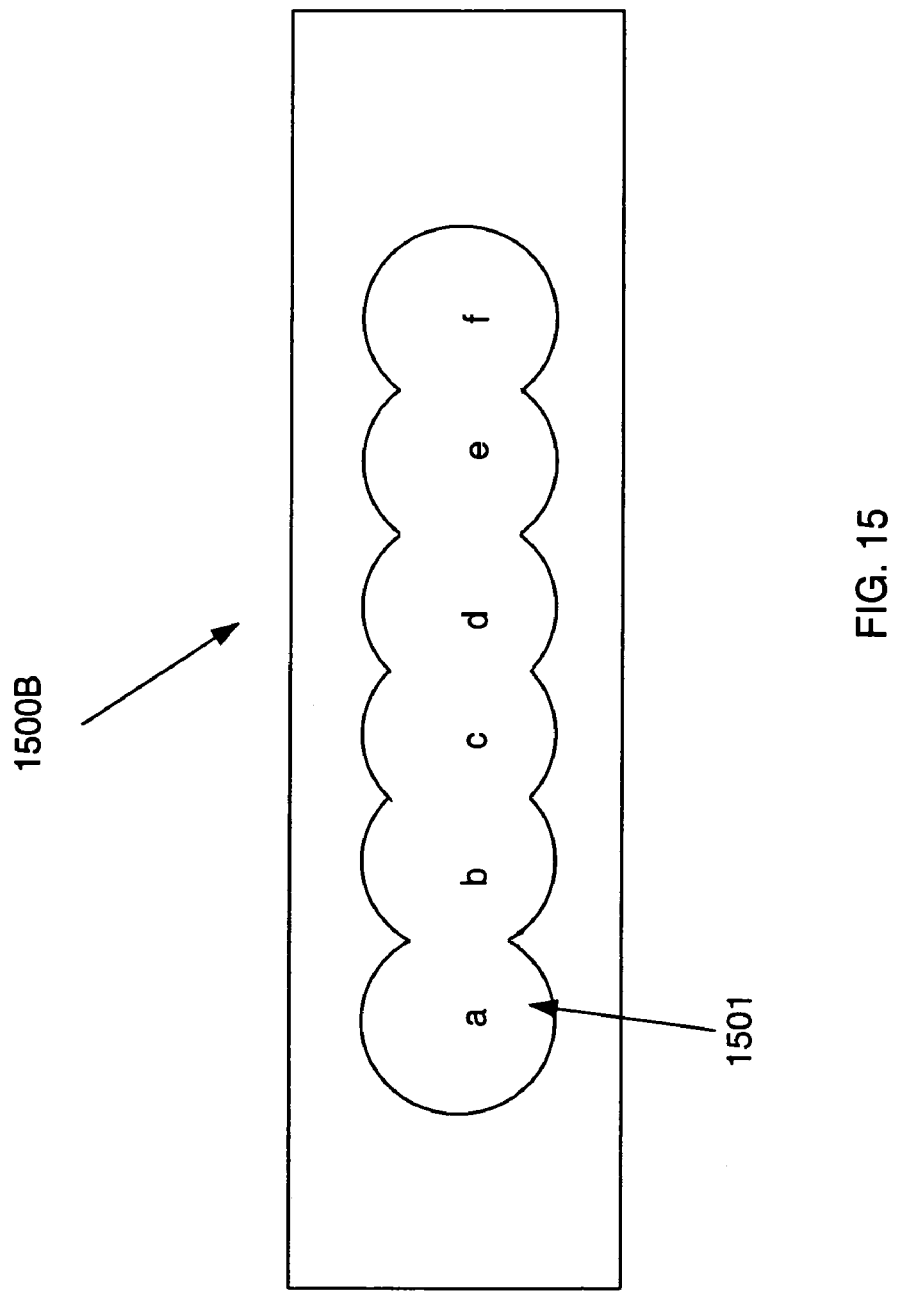

FIGS. 14 and 15 represent two bus bars 1500A and 1500B that may be used in alternative embodiments. In one embodiment, bus bar 1500A includes an elongated slot 1501 with generally straight edges along its length for receiving terminals of cells any where within the slot. In one embodiment, bus bar 1500B has a plurality of discrete positions 1502a-1502f for receiving cell terminals. Bus bars 1500A and 1500B can be used to effectuate the efficient and quick assembly of cells in parallel and/or series strings. Because bus bars 1500A and 1500B allow coupling at multiple locations along their length, cells can be rapidly interconnected with more than one cell to cell spacing. Such an ability to couple cells with one bus bar can be used to eliminate or reduce the need to stock multiple bus bars, wherein each would be used to achieve a different cell to cell spacing. Rapid assembly of different cell modules with different cell to cell spacing is effectuated as well. Subsequent welding may be used to make the connection permanent, or other techniques described further below may be used. Because only one standardized bus bar can in this manner be used, change over from one bus bar with a particular spacing, to another bus bar with another spacing is preferably eliminated when other cell to cell or terminal to terminal spacings are desired. Other embodiments of bus bars and other methods of interconnection of cells are within the scope of the invention, and will be described further below.

Figure 16:
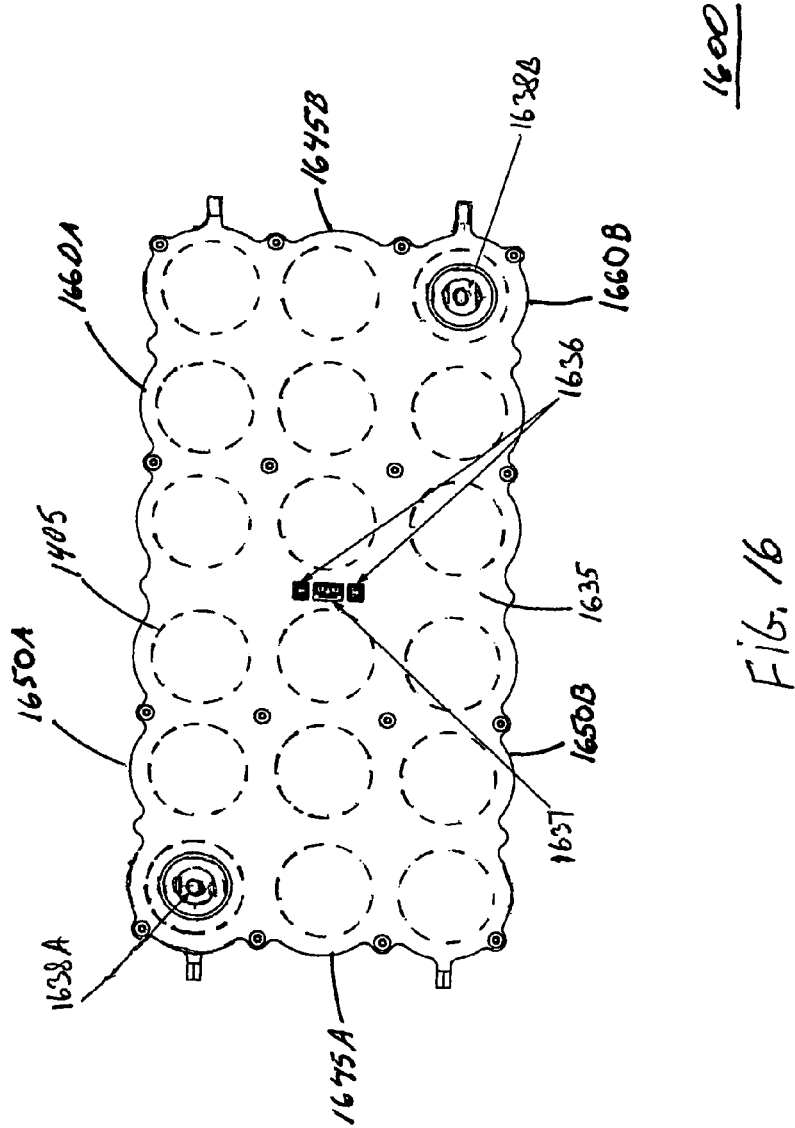
FIG. 16 represents a top view of a module of interconnected cells, in accordance with some aspects of the present invention.

FIG. 16 represents a top view of a module 1600. Module 1600 comprises an upper cover 1635, which is substantially flat. Note opening 1636 and 1637 in cover 1635. The openings may be used is some embodiments to provide access to voltage, module and cell balancing, and temperature monitoring output signals provided by internal circuits. Access to certain internal points provided by the connectors exposed in the openings 1636 may be desirable in some schemes. Also seen in FIG. 16 are outlines of 18 series interconnected cells 1405 within the module 1600. The openings 1636 and 1637 may be sealed by gaskets or the like.

Figure 17:
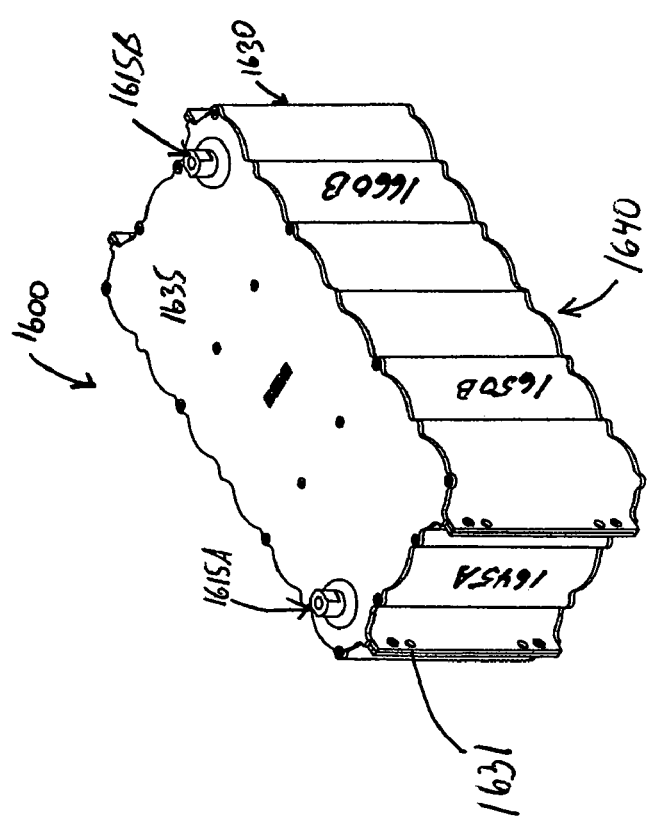
FIG. 17 represents a perspective view of the enclosure of the module of FIG. 16, in accordance with some aspects of the present invention.

FIG. 17 represents a perspective view of module 1600. A lower cover 1640 (not shown) may be similar in shape to the upper cover 1635, with or without openings. In one embodiment, module 1600 is a 1×3×6 module that can accommodate three rows of six side-by-side (rather than end-to-end) series interconnected cells 1405 disposed within. In one embodiment, the cells 1405 are interconnected in series string of cells by bus bars 1410 in a manner similar to that illustrated in FIG. 12. In one embodiment, each cell 1405 comprises a nominal operating voltage of about 2.5 volts so that a nominal 45-volt potential difference (18×2.5 volts) may be made available at ends of the series string at terminals 1615A and 1615B.

In an exemplary embodiment, module 1600 includes 8 components:

1. The upper cover 1635;
2. A lower cover 1640 (not shown);
3. End panels 1645A and 1645B; and
4. "Tongue" side sections 1650A and 1660B; and "Groove" side sections 1660A and 1650B.

Figure 18:
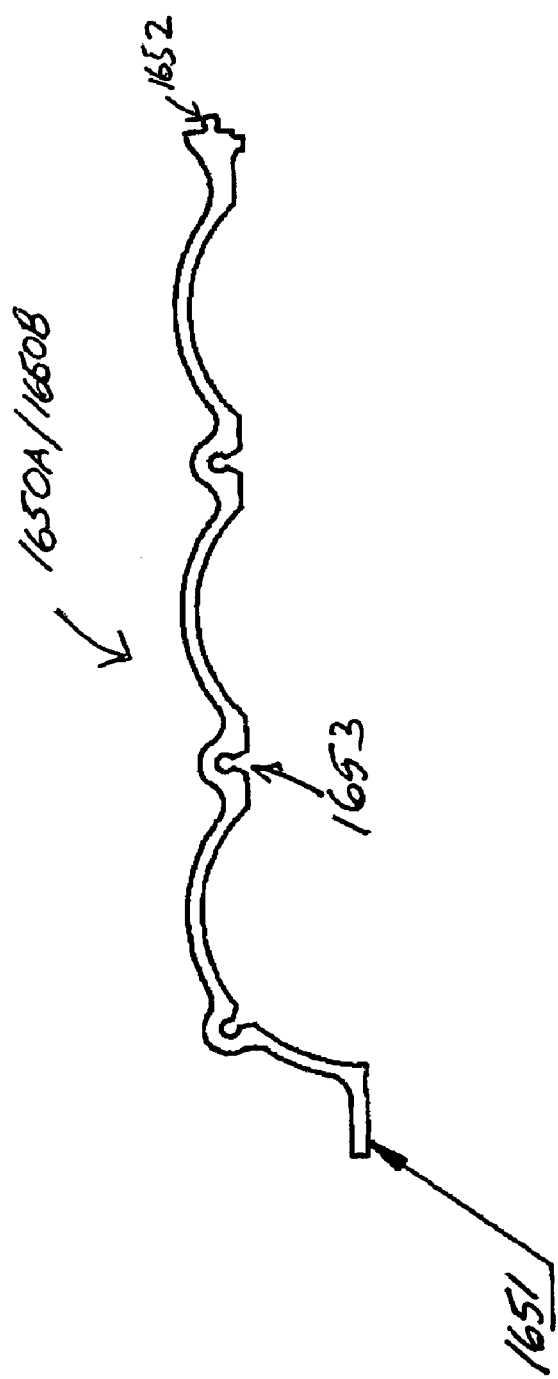
FIG. 18 represents a top view of a tongue section, in accordance with some aspects of the present invention.

FIG. 18 represents a top view of tongue side section 1650A and a bottom view of a tongue side section 1660B. In one embodiment, flange 1651 is designed for fastening with nuts and bolts, screws, rivets, or other fasteners to a corresponding flange on one of the sides of the end panel 1645A or 1645B, as shown in FIGS. 16 and 17. In one embodiment, tongue section 1650A comprises a "tongue" 1652, which is rounded at its end. The tongue 1652 is designed to couple to and interlock with a corresponding "groove" on a side section 1660A or 1650B, as will be illustrated in more detail below. In other embodiments, both ends of the end panels 1645A and 1656B, and side sections 1650/1660 comprise tongue or grooves (not shown) to allow the end panels and the side sections to be slideably coupled to each other and to thus eliminate the use of fasteners in their interconnection to each other.

Figure 19:
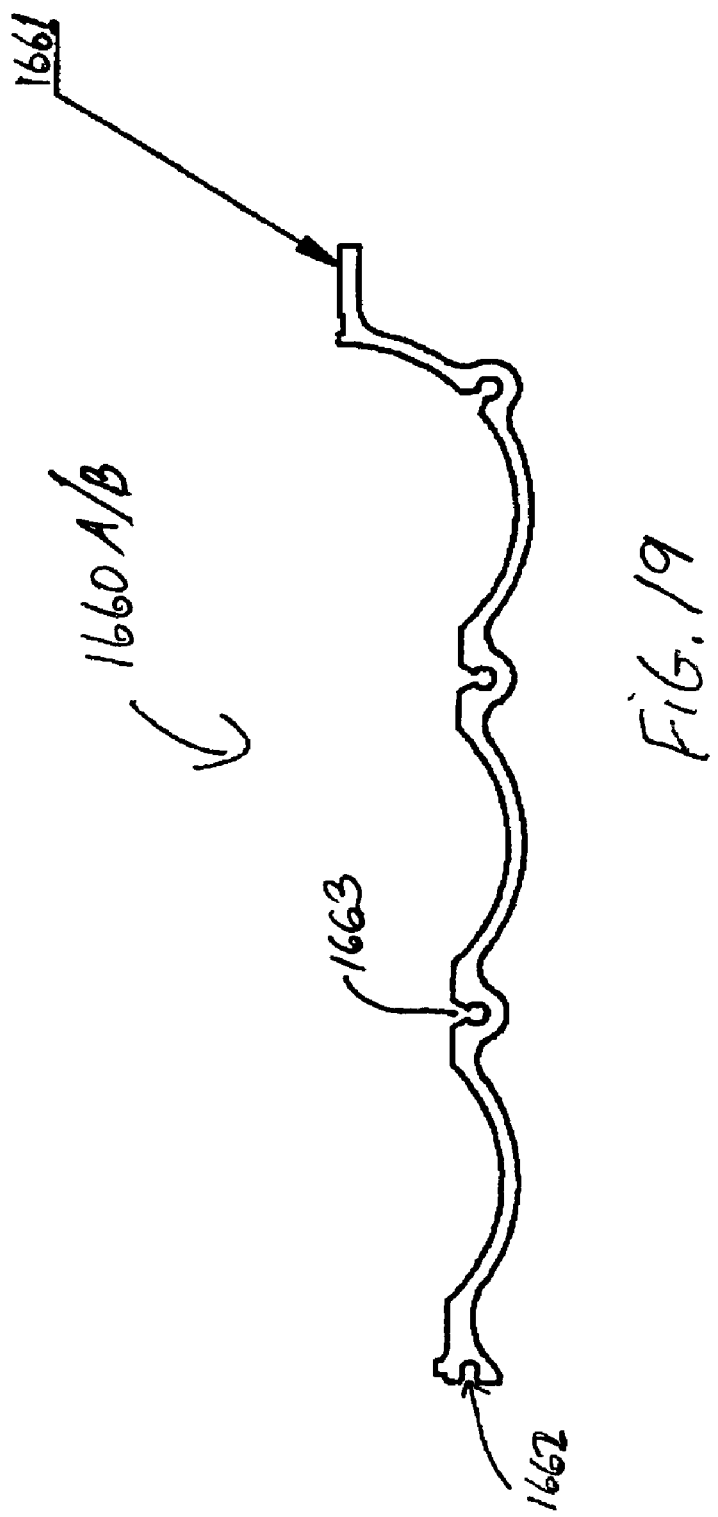
FIG. 19 represents a top view of a groove section, in accordance with some aspects of the present invention.

FIG. 19 represents a bottom view of a groove side section 1660A and a top view of a groove side section 1650B. Flange 1661 is designed for fastening to the flange on one of the sides of the end panel 1645A or 1645B. Sections 1660A/1650B comprise a groove 1662. The groove 1662 is designed to accept the tongue 1652 when respective tongue and groove side sections are aligned vertically and slid towards each other until they are at the same vertical level. Thereafter, the tongue and groove side section may be interlocked with each other in a slideable interference joint.

In one embodiment, one or more of the module 1600 components at points of interface with other components may comprise a gasket or other sealant material that may seal the interior of the module from that of the exterior.

The side sections 1650/1660 are contoured generally along the outlines of outermost cells 1405 of the module 1600 to provide a close fit between the walls of the module 1600 and the cylindrical shape of the cells. As compared to generally flat panels and sections of prior art enclosures, the present use of contoured panels provides a number of benefits, including improved heat transfer from the cells to the housing, and enhanced structural rigidity. Enhanced heat transfer occurs because of the reduced free space within an enclosure that is effected by the contoured side panels, as well from the reduced heat transfer distance from cell to panel. Furthermore, as compared to multiple modules comprising flat outer surfaces, which when closely positioned next to each other would have close or reduced space between the flat surfaces, when modules made with contoured outer surfaces are placed next to each other, more open space between the contoured surfaces may be provided between the modules. Ventilation and cooling of the modules can thus be improved.

Because tongue and groove joints between the sections 1650 and 1660 may allow some degree of flexing, upper and lower covers 1635 and 1640 may be used to provide structural rigidity to the module 1600.

In one embodiment, the end panels 1645A/B and the side sections 1650/1660 can also be joined using a tongue and groove joint at respective points of joinment. In this last embodiment, fasteners 1631 shown in FIG. 17 (e.g., nuts and bolts, screws, rivets) may thus not be needed at points of joinment between end panels and/or side sections 1650/1660.

In one embodiment, a module 1600 can be expanded in size by inserting intermediate side sections between adjacent tongue and groove side sections 1650 and 1660. An intermediate side section can be designed to have a tongue on one end for coupling to its corresponding groove side section, and a groove on the other end for coupling to its corresponding tongue side section. An intermediate side section may be designed to lengthen the rows of the module 1600 by one, two, three, or even a larger number of capacitor cells.

Furthermore, multiple intermediate side sections may be used on each side of the module 1600. For example, two identical or different intermediate side sections may be inserted between each set of the side sections 1650/1660. If each of the two intermediate side sections is designed to lengthen the rows of the module 1600 by two cells, the module 1600 would be capable of accepting three rows of ten cells each. In these embodiments, the upper cover 1635 and the lower cover 1640 would be replaced with appropriately-lengthened upper and lower covers designed for the lengthened module. The module 1600 may thus be expanded in a manner similar to the expansion of a dining room table with one or more extra panels.

In accordance with another aspect of the invention, a module's width may also be adjusted by insertion or removal of additional end panels. Indeed, a module may be built without any number of end panels.

Figure 20:
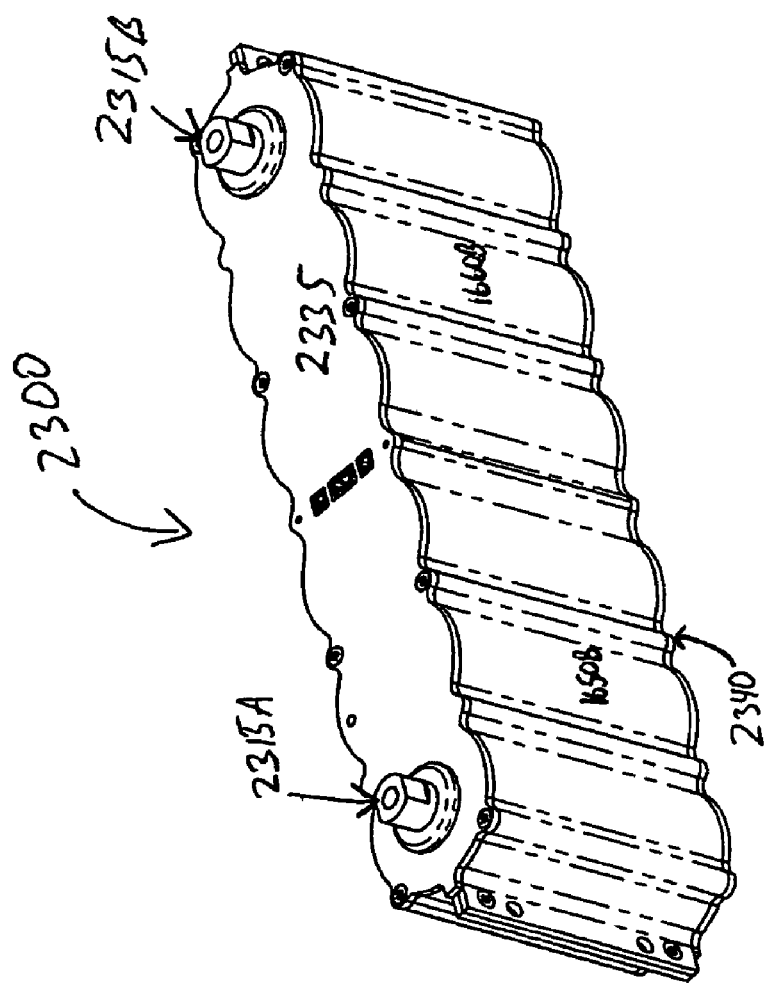
FIG. 20 represents a perspective view of a 1×1×6 (one row of six side-by-side cells) module, in accordance with some aspects of the present invention.

This concept is represented in FIG. 20, which is a perspective view of a 1×1×6 (one row of six side-by-side cells) module 2300. Cells internal to the module 2300 are similar to the cells of the module 1600 described above. The cells are interconnected in series such that in one embodiment a nominal 15-volt potential difference may appear between terminals 2315A and 2315B. Different electrical interconnections may be made in alternative embodiments of the module 2300.

Figure 21:
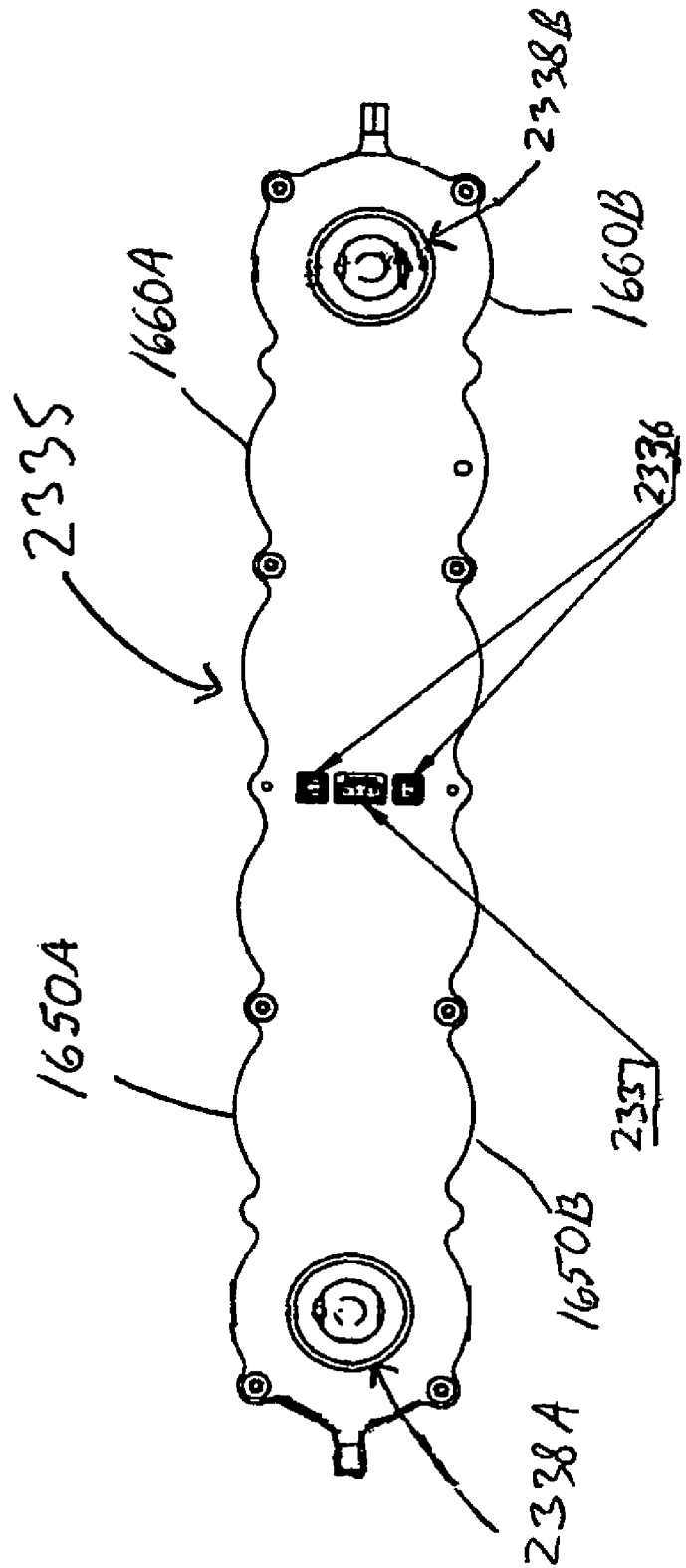
FIG. 21 represents top view of the upper cover of the enclosure of the module of FIG. 20, in accordance with some aspects of the present invention.

FIG. 21 represents a top view of module 2300. The enclosure of the module 2300 includes the following components. First, there is an upper cover 2335. The upper cover 2335 is substantially flat and, except for its geometry, is otherwise similar to the upper cover 1635 of FIG. 16. Within the upper cover 2335 openings 2338A and 2338B may be designed to receive the terminals 2315A and 2315B, and opening 2337 provides access to connectors that may be used for external monitoring of internal signals. Appropriate seals or covers may be provided at the openings as needed or desired. A lower cover 2340 is similar in shape to the upper cover 2335, but without terminal openings or openings for signal monitoring or voltage balancing. The lower cover 2340 is not illustrated. The enclosure of the module 2300 includes a pair of the tongue side sections 1650A and 1660B, and a pair of the groove side sections 1660A and 1650B. These components have already been described and illustrated in detail in relation to the module 1600. Referring back to FIGS. 18, 19, note slots 1653 and 1663 formed on the inner surfaces of the tongue and groove side sections 1650 and 1660, respectively. Printed circuit boards with balancing, monitoring, or other circuits may be inserted into or between these slots.

The module 2300 may also be expanded in length by inserting intermediate side sections between the tongue and groove side sections 1650 and 1660, as has been described above in relation to the module 1600. Multiple side sections may be used on each side of the module 2300.

The enclosure of the module 2300 does not include end panels, and is therefore narrow enough to accommodate a single row of capacitor cells, such as the cells 1405.

In other embodiments, a module may include end panels similar but narrower or wider than the end panels 1645A and 1645B. For example, an enclosure with slightly narrower end panels may be used for 1×2×N modules, i.e., modules of 2 rows of N cells arranged side-by-side. The number N may vary, e.g., the length of the rows may depend on the number and size of the intermediate side sections inserted between the tongue and groove side sections 1650 and 1660. Similarly, an enclosure with end panels that are wider than the end panels 1645A and 1645B may be used for 1×M×N modules, where M may be larger than three, i.e., the module may have more than three rows of side-by-side cells.

Multiple end panels may be used on each end of an enclosure. In various exemplary embodiments, two or more end panels are interconnected at each end of the module, to allow customization of module width. This is similar to the use of intermediate side sections to customize module length, as has been described above in relation to the modules 1600 and 2300. In some embodiments, the end panels may include tongue and groove portions at their sides, allowing the end panels to interconnect in the same manner as the tongue and groove side sections 1650 and 1660 interconnect using their respective tongues 1652 and grooves 1662. Thus, a module width may also be expanded in a manner similar to the expansion of a dining room table with one or more extra panels. In some alternative embodiments, multiple end panels on the same end are interconnected using other fasteners, for example, nuts and bolts, screws, or rivets.

Thus far we have described customization of module proportions in two dimensions, i.e., length and width. The same or analogous techniques may also be applied to expansion of modules in a vertical dimension, so as to allow vertical stacking of cells end-to-end on top of each other. In some embodiments, a module is customizable in only one of the three dimensions, be it length, width, or height. In other embodiments, a module is customizable in two of the three dimensions, for example, length and width, length and height, or width and height. In still other embodiments, a module is customizable in all three dimensions. In this manner, modules with different cell numbers and configurations may be assembled from a relatively small number of standardized components. Moreover, the tongue and groove joints decrease the need for use of fasteners in such customizable modules. In the described embodiments above, the preferred embodiment comprises covers, end panels, and side sections that are made of aluminum, for example, extruded or molded aluminum, however, in different embodiments one or more of these components could be made of other material. For example, because a large percentage of heat is typically generated at the top and bottom of a cell at the terminal, the top and bottom covers are preferably made of a thermally conductive material such metal to conduct heat away from the capacitors, while other components may be made of alternative materials, for example, light weight material such as plastic.

Figure 22:
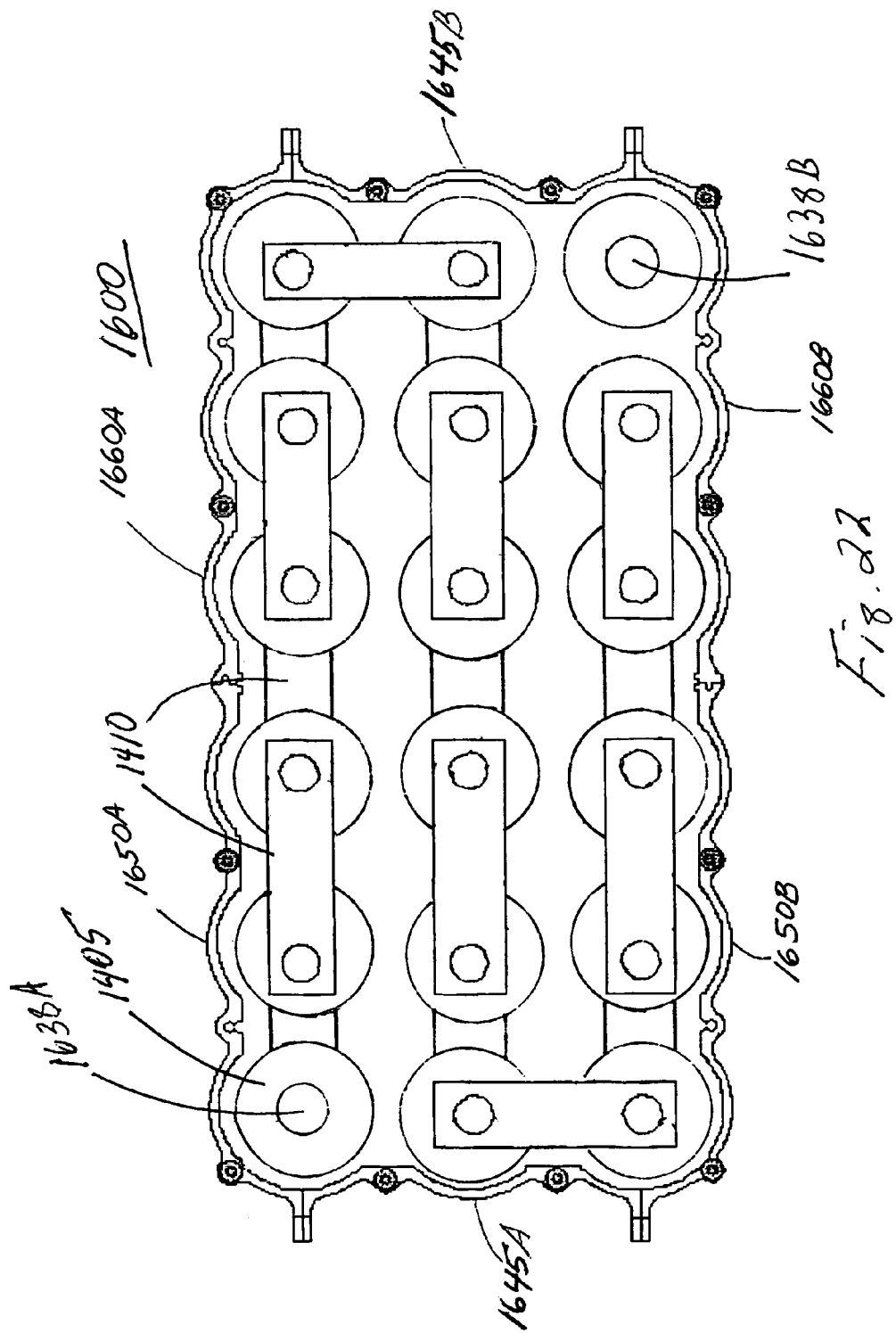
FIG. 22 represents a top view of a module with cell interconnected by bus bars, in accordance with some aspects of the present invention.

In FIG. 22 there is seen a plurality of series interconnected cells 1405 within a module 1600. The module 1600 is shown with its top cover removed. Adjacent cells in the series string are interconnected at their terminals by bus bars 1410. Top bus bars are seen in their entirety and bottom bus bars are seen hidden by respective cells they are connected to. The present invention identifies that when cells are interconnected within a module, their movements relative to the walls of the module may be desired to be restricted or substantially eliminated. In some embodiments, a flat relatively rigid stabilizing element with one or more cutouts assists in performing this function. Terminals 1638A and 1638B provide access to ends of the series string of cells housed within the module 1600.

Figure 23:
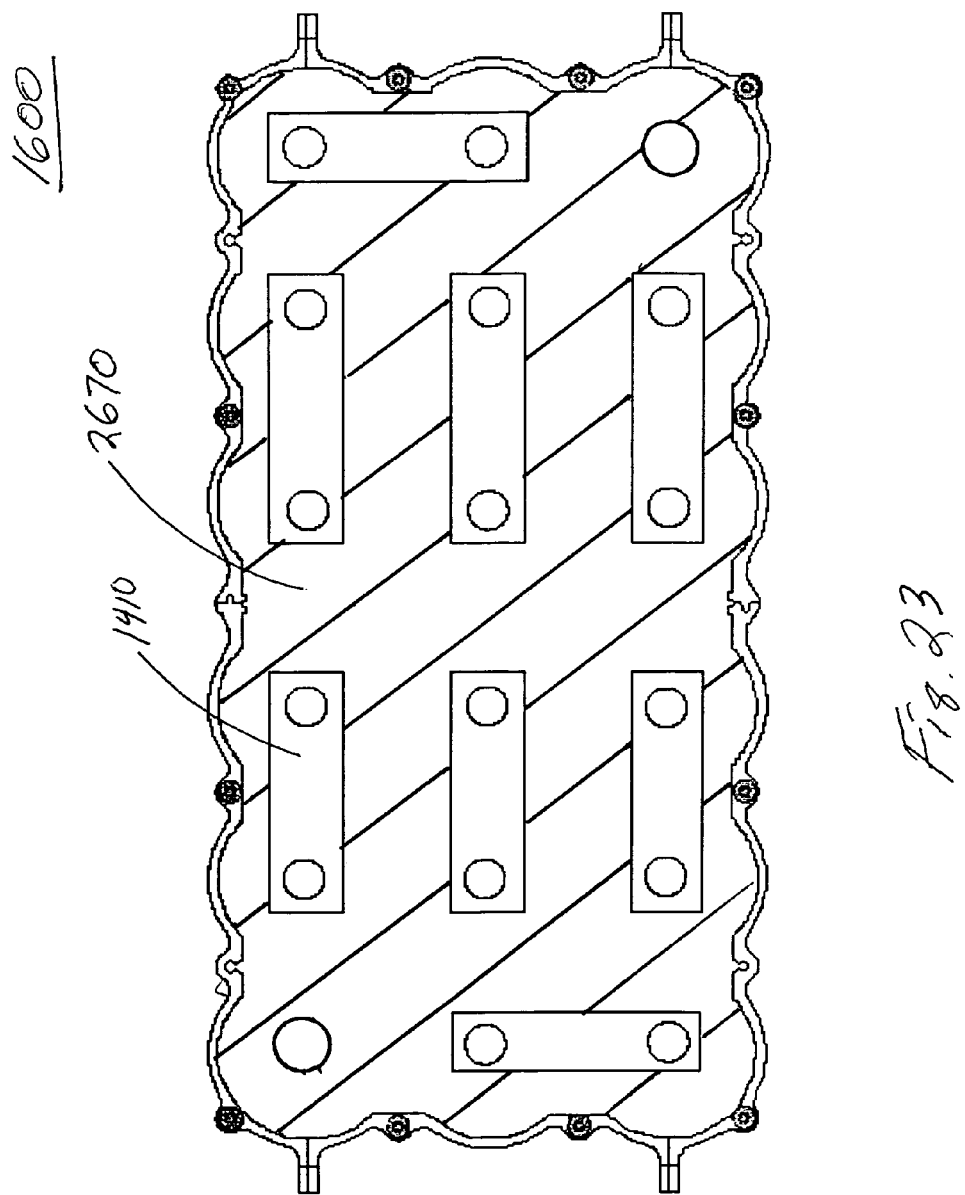
FIG. 23 represents a top view of a module with a stabilizer mounted over bus bars, in accordance with some aspects of the present invention.

In FIG. 23 a stabilizer 2670 is shown placed on top of the capacitor cells. A surface of the stabilizer is defined by the angled hatched lines. The stabilizer 2670 may be made from any number of rigid or semi rigid materials. A similar stabilizer may be present at the bottom of the capacitor cells 1405. In one embodiment, stabilizer 2670 is about 0.062 inches thick.

It should be understood that the stabilizer 2670 need not be absolutely rigid, however, the stabilizer 2670 should be sufficiently rigid so as not to flex to a point where the capacitor cells 1405 move excessively (beyond design limits) under forces and in positions that the module 1600 may be expected to experience.

Figure 24:
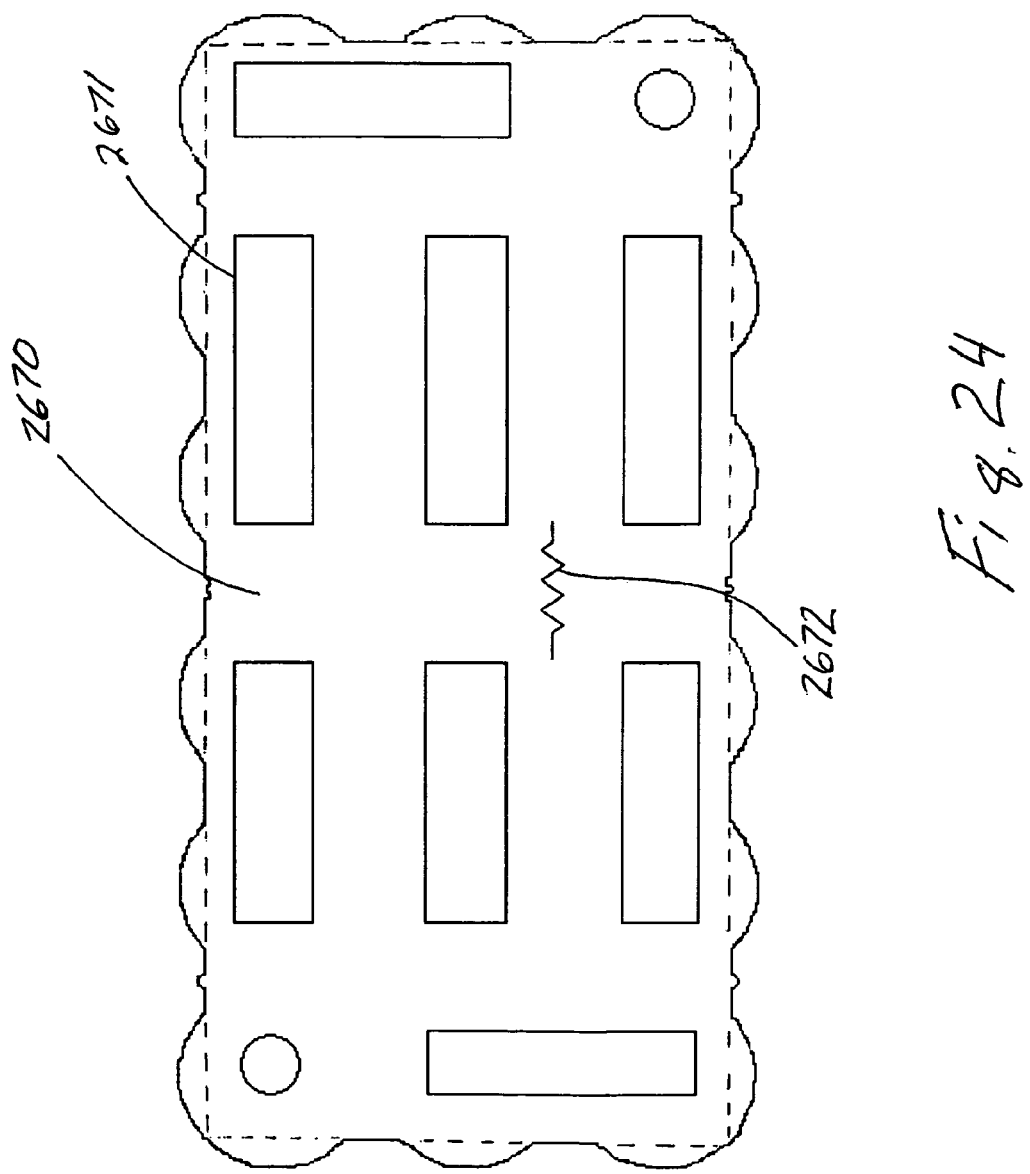
FIG. 24 represents a stabilizer, in accordance with some aspects of the present invention.

In FIG. 24 stabilizer 2670 is shown removed from within a module. Stabilizer 2670 preferably comprises a plurality of cutouts 2671. In one embodiment, cutouts 2671 are dimensioned to closely fit over the outer dimensions of bus bars 1410 and terminals 1638. In other embodiments, stabilizer may closely fit over cells 1405. Cutouts 2671 are positioned relative to each other in a similar relationship to that of the bus bars 1410 and terminals 1638. In other words, when placed over the top of the cells 1405 and terminals 1638, the cutouts 2671 will preferably slip fit over the bus bars and terminals. When positioned in this manner, the cutouts 2671 preferably restrict movements of the cells 1405 relative to each other in a plane of the stabilizer 2670.

In FIG. 24 it is also seen that stabilizer 2670 also has an outer periphery that is similar in geometry to the inner periphery of the module 1600. When placed over the top of the cells 1405 and terminals 1638, the outer periphery of stabilizer 2670 preferably abutably slips within the module 1600 walls. When positioned in this manner, the stabilizer preferably restricts movements of the cells 1405 relative to the module 1600 walls. Although shown to have a geometrical correspondence with a geometry of the module, it is understood that desired functionality may be achieved with other geometries of stabilizer 2670, for example, as with a rectangular shape indicated by the dashed lines, or some other geometry that effectuates restraint of movements of cells 1405 relative to the module 1600 walls.

In one embodiment, stabilizer 2670 may also be used to restrict movement of the cells 1405 in the vertical dimension (transverse to the plane of the stabilizer 2670) when it is dimensioned with a thickness that is slightly more than a free distance between the top surface of each of the cells 1405 and a bottom surface of a subsequently attached cover. In this last embodiment, when the stabilizer 2670 is positioned over the bus bars 1410, the stabilizer may become pressed against the top surface of the cells, and when a cover is attached to the module 1600, the cover will press against the stabilizer and, hence, the cells. In this manner the cells 1405 may become further restrained within the module 1600.

As a person skilled in the art would understand after perusal of this document and the attached Figures, it would be undesirable to allow the bus bars 1410 to short electrically to the covers of the module 1600. In one embodiment, a stabilizer 2670 with a sufficient thickness may be used to provide sufficient clearance between the bus bars 1410 and a subsequently attached cover. For example, when a stabilizer 2670 is placed over the bus bars 1410 and over a top surface of the cells 1405, if it is of sufficient thickness, an upper surface of the stabilizer may extend above an upper surface of the bus bars and, thus, prevent any contact between a subsequently attached cover and the bus bars.

It is also preferred to increase thermal conductivity between the cells 1405 and the exterior of the module 1600. To achieve one or both of these goals, one or more insulator and/or thermal pads may be placed between a subsequently attached cover and the bus bars 2610.

In another embodiment, thermal pads may also be placed between the peripheral cells 1405 that are directly opposite wall of the module and the wall so as to provide a thermal transfer path between the cells and the walls of the module, and as well, to provide an additional restraint of movement between the cells and the module.

Figure 25:
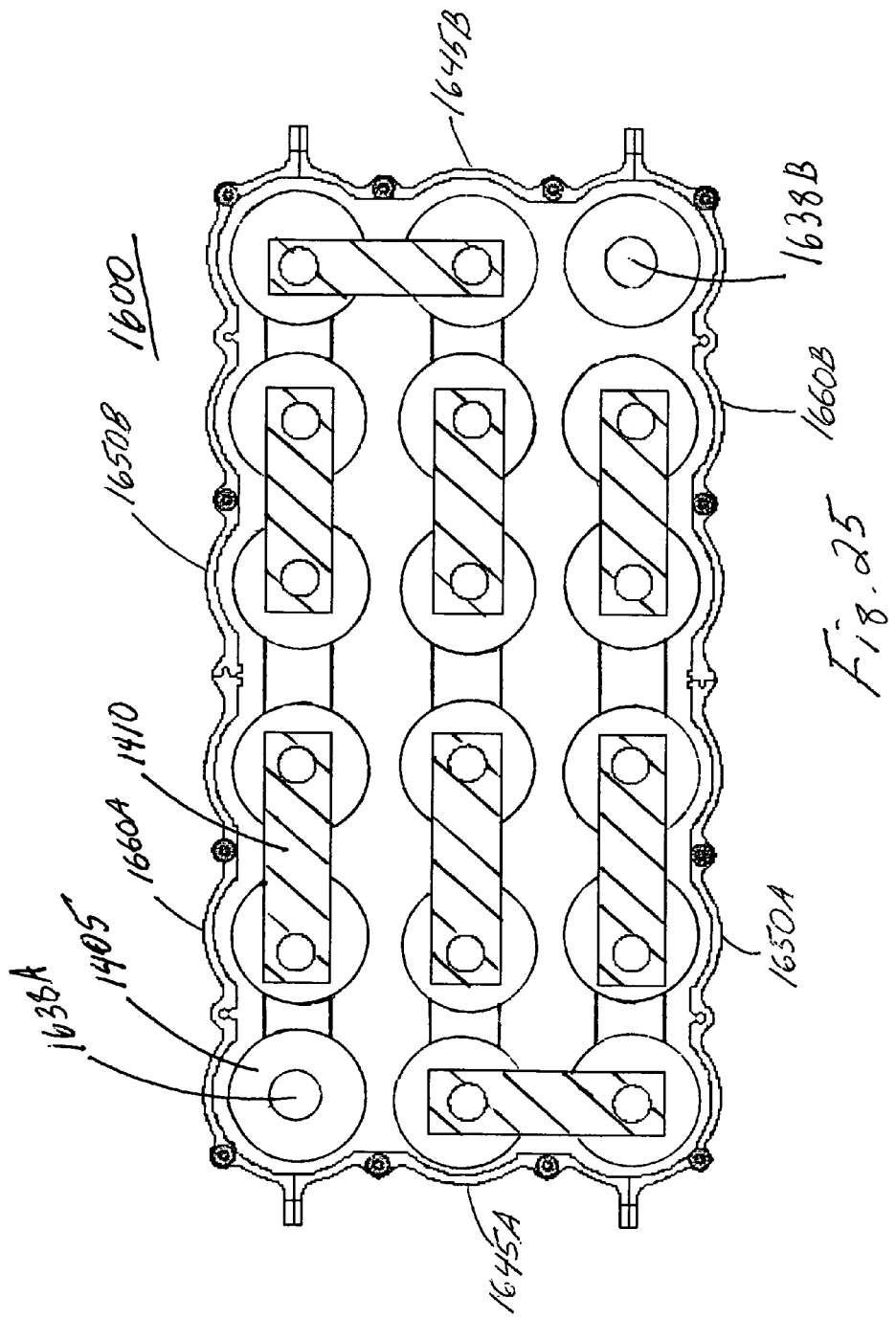
FIG. 25, represents a top view of a module with cell interconnected by bus bars with thermal pad mounted thereon, in accordance with some aspects of the present invention.

In FIG. 25, thermally conductive pads and/or electrical insulators are represented by angled lines. Thermal pads may be made from a sheet of electrically-insulating material having high thermal conductance with an adhesive applied to one or both sides of the sheet. Individual thermal pad pieces may be applied to the top of each bus bar 1410. Each piece may be shaped as, and adhere to, its corresponding bus bar 1410. In this way, the amount of the thermal pad material may be minimized, reducing total module cost. It is identified that when thermal pads and/or insulators are applied to bus bars 1410, and when a cover is attached to the module 1600, the cover will preferably press against the thermal pads. In this manner, the thermal pads may also act to restrain movement of the bus bars, and hence cells 1405, relative to the walls of the module, as well as electrically insulate the bus bars 1410 from the module 1600.

In one embodiment, it is identified that an uncured thermally conductive sheet made of conductive silicon or other polymer may be used to provide heat transfer, sealing, as well as stabilization of components within a module, for example as available from Saint Gobin Performance Plastics Corporation, Worcester, Mass. 01605 as model TC100U. In one embodiment, such a sheet of thermally conductive material may be shaped with a slightly bigger outer dimension than stabilizer 2670, such that when placed over the stabilizer (when used) and/or the bus bars, it conforms to the outer periphery of the module 1600. If such a thermally conductive sheet is subsequently pressed by a top and/or bottom cover onto the periphery of the module 1600, it may be used to seal the periphery. After heating of a thermally conductive sheet such as TC100U, those skilled in the art that such a sheet may cure and bond to a surface it is placed on. Thus if placed onto the bus bars 1410, and subsequently covered by a top or bottom cover, a thermally conductive sheet may become heated when bus bars 1410 conduct current. Such or other heating may be used to bond the bus bars 1410 to the top or bottom cover via the thermally conductive sheet, and thus provide a stabilizing mechanism that restrains movement of the cells. It is identified that thermally conductive sheets or pads may be used in conjunction with or without embodiments of a stabilizer 2670.

Referring back to FIG. 24, in one embodiment, a stabilizer 2670 may be populated with one or more components or circuits 2672 that may be used in some module embodiments. For example, the stabilizer 2670 may be comprised as a printed circuit board with electronic connections and circuitry on the printed circuit board provided to effectuate cell-to-cell voltage balancing, voltage monitoring, temperature monitoring, alarm signaling, and/or other functions. In one embodiment, the thermal pads may be provided on bus bars 1410 with sufficient thickness to provide electrical clearance between the circuits and the circuits 2672. In one embodiment, thermal pads may also be placed on top of the printed circuit board components, providing electrical insulation and thermal conduction between the components and an upper cover of the module 1600.

In one embodiment, the stabilizer 2670 may be formed to comprise a plurality of bus bars 1410 that are disposed within the stabilizer, for example as may be formed by molding a stabilizer about bus bars that are positioned in a predetermined pattern that corresponds to their intended interconnection to terminals of cells 1405 that are disposed with a particular cell to cell spacing. In this manner the cells 1405 may be positioned with the desired terminal to terminal spacing, and subsequently the bus bars 1410 within a stabilizer 2670 may be placed over the terminals in one step. The bus bars can be subsequently coupled more permanently to the respective terminals.

Although described as capable of being achieved by laser welding, coupling of cells is also capable of being effectuated using heat fit techniques similar to that used to seat and attach lid 1020 to the collector plate 700 (FIGS. 11 and 12). To further describe such functionality, bus bars as described above will for the moment be described more generically as interconnect(s) 1000 and in a context that may find applicability in many fields.

Figure 26:
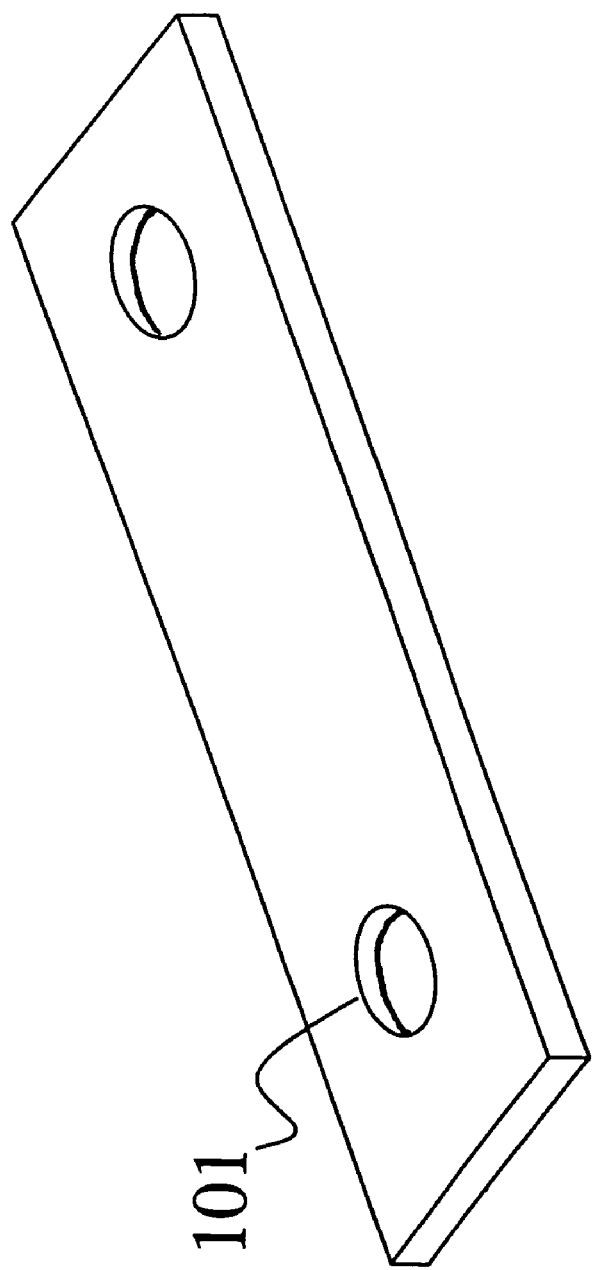
FIG. 26 represents a thermally coupled interconnect, in accordance with some aspects of the invention.

FIG. 26 represents a preferred embodiment of a bus bar or interconnect 1000. in one embodiment, interconnect 1000 may comprise a conductor. In one embodiment, interconnect 1000 may comprise a metal. In one embodiment, interconnect 1000 may comprise aluminum. In one embodiment, interconnect 1000 is formed to include one or more through hole or void 101 that is formed therein.

Figure 27:
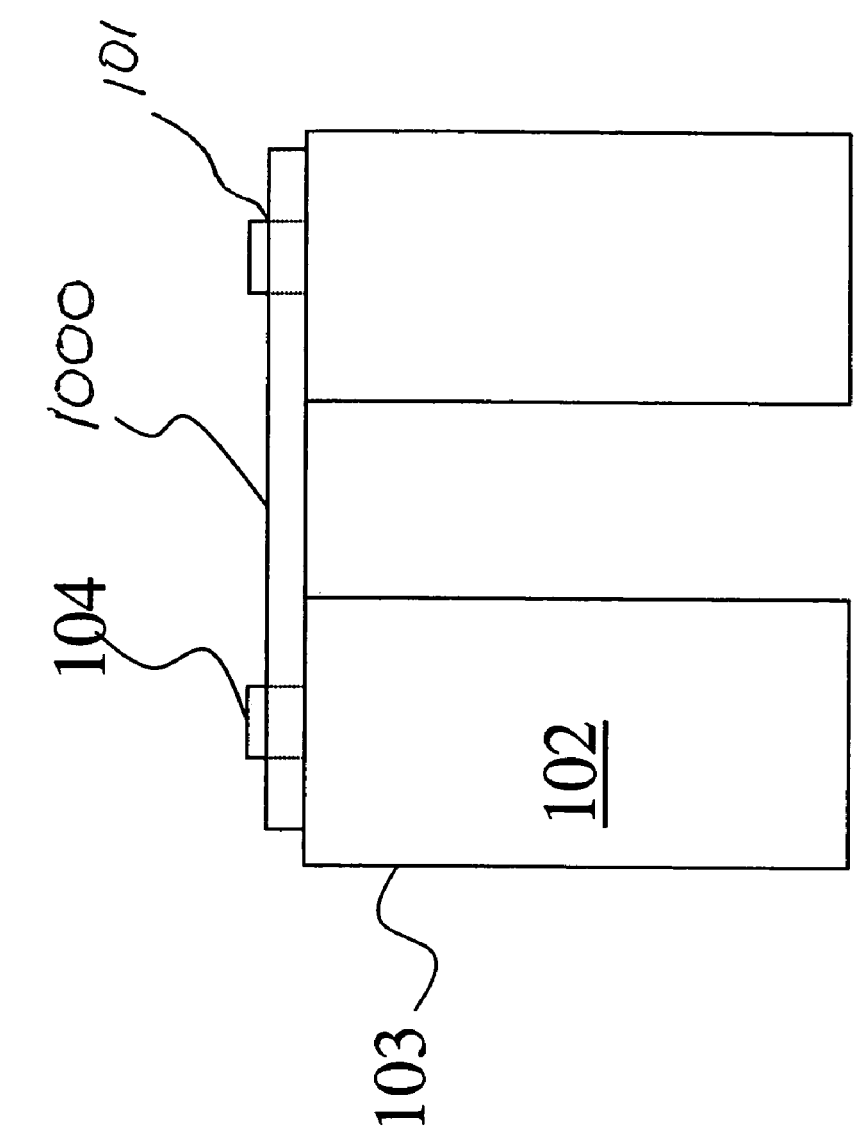
FIG. 27 represents a thermally coupled interconnect coupled to two cell terminals, in accordance with some aspects of the invention.

In FIG. 27 two devices connected by an interconnect are shown. In one embodiment, devices 102 comprise a housing 103, and at least one terminal 104. In one embodiment, terminal 104 may comprise a conductor. In one embodiment, terminal 104 may comprise a metal. In one embodiment, terminal 104 may comprise aluminum. In the embodiment shown, ends of the terminals 104 extend through voids 101 of an interconnect, but in other embodiments, the ends of the terminals may be disposed within the voids such that they do not completely extend through the voids. In one embodiment, voids 101 may extend only to a certain depth within an interconnect. In one embodiment, devices 102 comprise a general class of devices that may be joined mechanically and/or electrically. In one embodiment, devices 102 comprise batteries. In one embodiment, devices 102 comprise capacitors. In one embodiment, devices 102 comprise double layer capacitors. In one embodiment, housing 103 comprises a geometry and dimension such that a terminal 104 can be implemented thereon. As described further below, in one embodiment, two or more devices 102 having a terminal 104 may be coupled by one or more interconnect 1000 without the use of welding or other intermediate components or elements, for example, solder, brazing, adhesives, nuts, bolts, clamps, or the like.

In FIG. 28, three perspective views of three possible exemplary terminals of a device 102 are represented. In one embodiment, terminals 104 comprise a top portion 104*b* and a bottom portion 104*a* that are separated in distance by a height "h". In one embodiment, a periphery of the top and bottom portion may be described by a geometry, for example, a circle, a rectangle, an ellipse, a square, a polygon, or the like; for example, a radius defining an outer surface of the terminal may or may not vary at different cross-sections between the top and bottom of terminal 104. In one embodiment, between the top and bottom portion of a terminal 104, a geometry of the terminal may change, for example, as in a terminal shaped in the form of a truncated cone.

It is identified that when the size and/or geometry of a terminal 104 differs from that of a void formed within an interconnect 1000, coupling of the terminal 104 to the interconnect 1000 via the void may be made difficult or impossible to achieve. For example, if a radial dimension of a void 101 comprising a circular geometry is smaller than or the same as a radial dimension of a cylindrical terminal 104, a fit of the terminal within the void may be difficult if not impossible to achieve, in which case a solder, a weld, or a physical force may be required to effectuate coupling of the interconnect 1000 to the terminal. In the case of physical force, its application could act to damage a terminal 104, the interconnect 1000, or a device 102 itself.

Nevertheless, the present inventors have identified that an interconnect 1000 may be utilized with voids 101 that comprise a radial geometry that is the same as or smaller than a radial geometry of a terminal 104, and that high integrity and low resistance coupling therebetween can be made without additional components or material and without damage to the terminal, interconnect, or device. Conversely, the inventors have identified that a terminal 104 comprising a radial geometry that is the same as or larger than a radial geometry of a void 101 can be coupled to an interconnect 1000 without use of an additional component or material and without damage to the terminal, interconnect, or device.

In a preferred embodiment, terminals 104 comprise an outer cylindrical surface that can be defined by a height, and a cross-sectional radial dimension that is substantially constant. In the preferred embodiment, interconnect 1000 comprises at least one void 101 formed within the interconnect that can be defined by a height and a cross-sectional radial dimension that is substantially constant. In the preferred embodiment, the substantially constant dimension of the at least one void 101 is the same as or less than that of the terminals 104. In the preferred embodiment, the void 101 extends through the interconnect; although in other embodiments, a void can be formed through only a certain thickness of an interconnect.

In an exemplary embodiment, terminals 104 comprise a cylindrical geometry with a height of about 0.15 inches and a circular radius of about 0.553 inches. In an exemplary embodiment, interconnect 1000 comprises at least one void 101 with a circular radius of about 0.550 inches and a height of 0.14 inches. The respective measurements given were taken at room temperature of about 70 degree Fahrenheit.

The present inventors have identified when an interconnect 1000 is heated to a temperature of about 350 degrees Fahrenheit, a radial dimension describing a void 101 may be increased such that the void may be slipped over a terminal 104 with a larger radial dimension with use of minimal force. It is identified that after a subsequent equilibration of the temperature of the interconnect to that of the terminal by cooling, forced or natural, the radial dimension describing the void 104 becomes reduced to thereafter form a strong rigid mechanical and/or electrical connection between the terminal 104 and interconnect 1000. In one embodiment, wherein a terminal 104 and an interconnect 1000 comprise an aluminum material, when a void within the interconnect is allowed to shrink about a terminal, the interconnect acts to clamp about the terminal at points of interface between the terminal and interconnect. The clamping forces act to constrain the terminal 104 within the void 101 of the interconnect 1000. In the case of aluminum interconnects and terminals, it is identified that the forces are of sufficient strength to break through oxide layers that may have been present on the surface of the terminals.

In one embodiment, wherein a terminal 104 is a terminal of a double-layer capacitor, the subsequent connection formed between a terminal 104 and an interconnect 1000 is of sufficient strength that the interconnect cannot be separated from the terminal without damage to the capacitor. When two or more capacitors are coupled at their terminals 104 by an interconnect 1000 in manner described herein, the resultant assembly formed of the capacitors and the interconnects can be relied on to be rigid and/or self-supporting. In one embodiment, the assembly can be relied on to be rigid and/or self-supporting over a range of −50 degrees Celsius to +85 degrees Celsius.

In one embodiment, wherein the interconnect 1000 and terminals 104 comprise same or similar materials, it is identified that after the interconnect is allowed to cool to the temperature of the terminals, both the terminals 104 and the interconnect 1000 will expand and contract at the same or similar rate when exposed to a particular temperature, in which case the radial dimensions of the terminals 104 and the voids 101 would be expected to change at the same or similar rate, and in which case the clamping forces generated by the interconnect would be expected to stay more or less constant. It is identified that the radial dimensions of the terminals and the voids can in this manner be expected to maintain integrity of a connection between one or more devices over a wide range of operating temperatures without the use any additional component or material, and that the connection therebetween can be considered to be as mechanically and/or electrically permanent as that provided by the prior art. In fact, high integrity and low resistance coupling may be maintained even when over 2000 amperes of current flows between a terminal and an interconnect, as may occur when double-layer capacitors are used. Such coupling may be maintained despite the high temperatures that may be generated at the terminals and without the need for additional materials or devices to maintain the coupling. In one embodiment, low resistance and high integrity coupling is maintained over a temperature range that spans −40 to +85 degrees Celsius.

In an alternative embodiment, a terminal 104 may be cooled to a temperature sufficient to reduce the radius of the terminals, and a void 101 of an interconnect 1000 can subsequently be easily slipped onto the terminal. After equilibration of temperatures between the terminal 104 and the interconnect 1000, expansion forces of the terminal against the interconnect can be used to achieve similar effects and advantages as described above.

In some embodiments, wherein a terminal 104 comprises a geometry different from that of a circular cylinder, for example, a rectangular or elliptical cylinder, such geometry may be used with correspondingly shaped void 101 to further enhance the integrity of a connection between an interconnect 1000 and the terminal. In a case of an interconnect 1000 with an elliptically shaped void 101 that is coupled to an elliptically shaped terminal 104, the elliptical shape of the terminal within the void can be utilized to resist torsional movements of the terminal relative to the interconnect, for example as may occur during shaking or vibration that may be applied to a module of multiple devices coupled by one or more interconnect 1000. It is identified that use of terminals and interconnects comprising the other than circular geometries can be implemented in the context of temperature induced expansion or contraction fitting of an interconnect 1000 onto a terminal 104 as has been described above.

In one embodiment, wherein a terminal 104 comprises a gradually or slightly changing cross-sectional geometry along its height, for example, as embodied by a truncated cone, and wherein voids 104 of an interconnect 1000 comprise a corresponding matching geometry, it is identified that such gradually or slightly changing geometry may facilitate alignment and the fitting of a void 101 over a terminal 104. For example, wherein a cross-sectional bottom portion of a void is larger than a cross-sectional-portion of a top portion of a terminal, alignment and fitting of the terminal within the void can be more easily effectuated. In one embodiment, only an interconnect 1000 is provided with a void with a gradually or slightly changing geometry. In one embodiment, only one end of a void is provided with a gradually or slightly changing geometry, for example, as by cylindrical void comprising a chamfered or taper at one end, for example, at a bottom end that is first fitted over a terminal. In one embodiment, wherein two or more interconnects 1000 are disposed within a stabilizer 2670 (FIG. 24), which may subsequently be used to align the interconnects to a plurality of pre-positioned devices in one step, provision of voids with gradually or slightly tapered geometries within interconnects 1000 can be used to more easily align the interconnects to corresponding terminals 104 of the devices.

Figure 29:
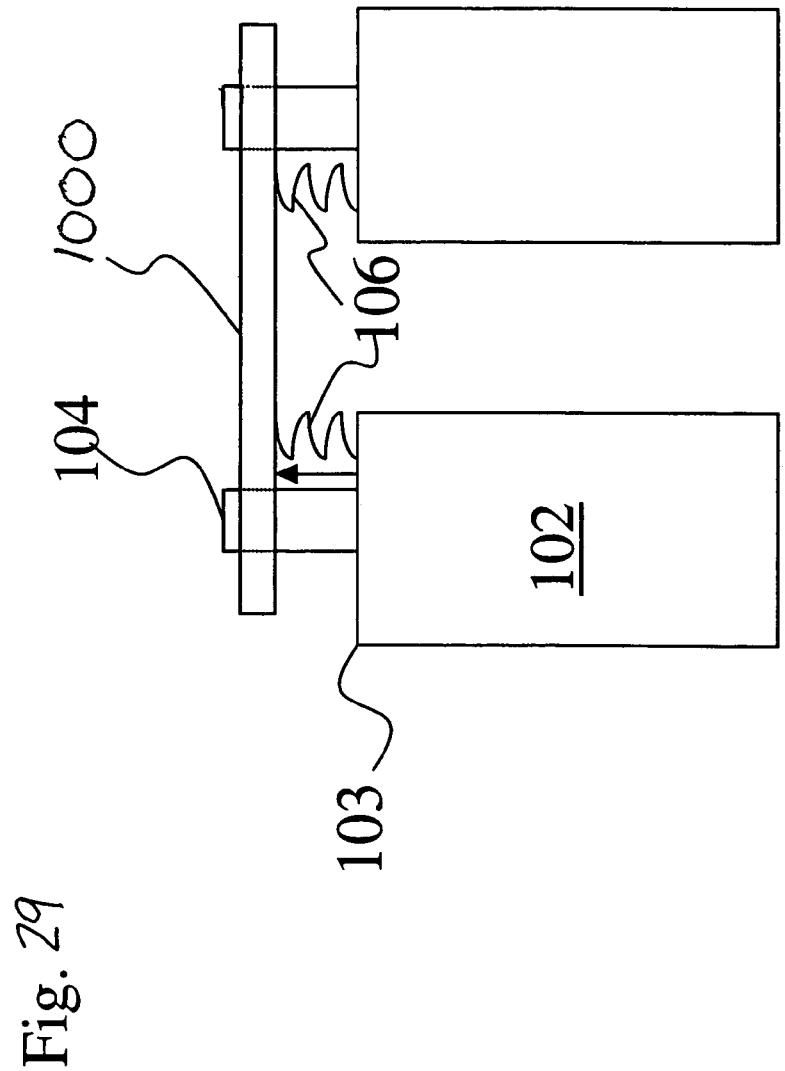
FIGS. 29 and 30 represent a thermally coupled interconnect coupled to two cell terminals and a separation mechanism, in accordance with some aspects of the invention.
Figure 30:
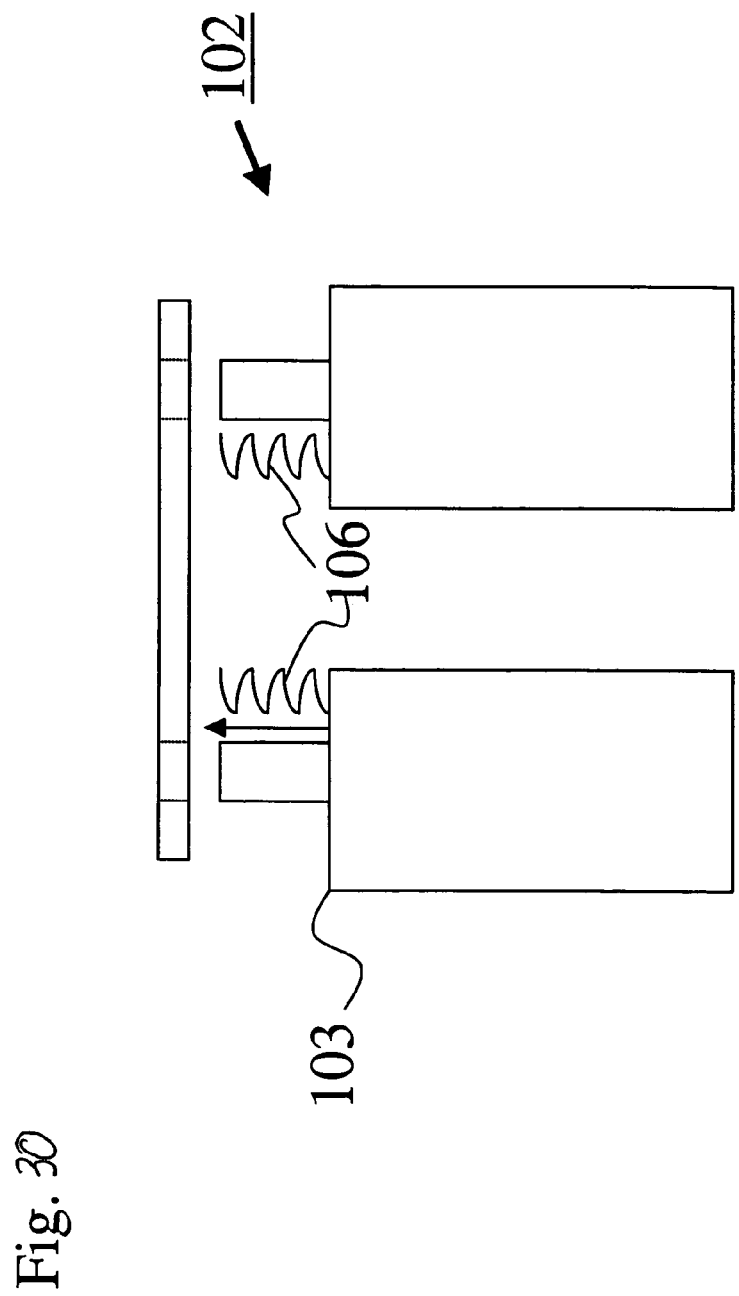

Referring to FIG. 29 and FIG. 30, in one embodiment, it is identified that terminals and interconnects may each comprise a material that has a different temperature coefficient. When materials is used for terminals 104 that is different from that of interconnects 1000, it is identified that above or below a certain temperature, a radial geometry of a void 101 or terminal 104 may change at different rate than a corresponding terminal or void, in which case the integrity of a previously temperature induced expansion or contraction connection made therebetween may become degraded. In one embodiment, an appropriate selection of materials with different temperature coefficients may be made for use as an interconnect or terminal such that degradation of a connection between a terminal and an interconnect may be made to occur in predictable manner, in which case an interconnect could be used as a "fuse." For example, at some given temperature, the compression or expansion forces between a terminal and an interconnect could be made to weaken to a point that a mechanical or electrical connection therebetween could be caused to fail in a predictable manner. In an electrical device context, above or below a certain temperature, such as during an unsafe overheating of an electrical device, the electrical device, via its thermally fitted interconnect, could be selectively disconnected from a terminal and a path of current flow. In one embodiment, at a particular temperature, release of an interconnect from a terminal can be assisted by use of gravity or an assist device, for example as represented by spring 106, which when placed against the interconnect, at a particular temperature the spring could be used to provide a force to assist in separating interconnect 1000 from a terminal 104. It is understood that design of spring 106 or other disconnect device would for safety need to consider the presence of surrounding enclosures and electrically charged devices.

Figure 31:
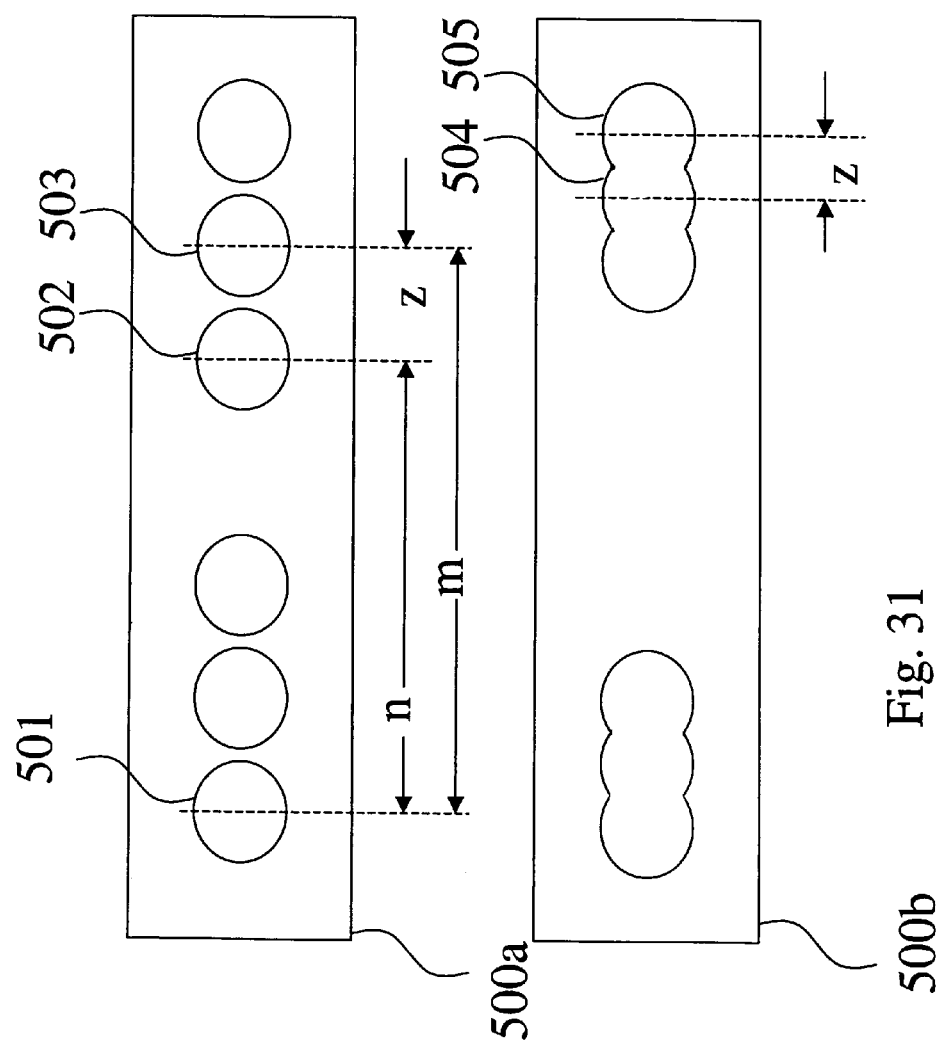
FIG. 31 represents two different thermally coupled interconnects, in accordance with some aspects of the invention.

Referring to FIG. 31, there are represented two interconnects 500*a* and 500*b*, each comprising voids with a geometry that corresponds in whole or in part to the geometry of a corresponding terminal 104. Interconnects 500*a* and 500*b* provide functionality similar or the same to that of interconnects 1500A and 1500B represented by FIGS. 14 and 15. For example, with cell terminals shaped in the form of a circular cylinder, the voids 501, 502 503, 504, 505 may be shaped to comprise at least in part a circular or semicircular geometry. Positioning of terminals of cells within the voids of only one of the interconnects 500*a* or 500*b* can subsequently be used to effectuate a plurality of different cell-to-cell spacings.

It is has been identified that manufacture of modules may require the ability to provide interconnected devices as modules assembled in many different form factors. As discussed, the assembly of modules into different form factors may be advantageously facilitated using one or more module component as previously described herein. In the context of temperature induced expansion or contraction fitting of interconnects to terminals, quick and easy interconnection of a series of devices and their integration into a module may be further facilitated. Using expansion or contraction fitting, a desired terminal-to-terminal spacing of devices or cells can be achieved quickly to achieve and match a particular configuration or module form factor. In one embodiment, such terminal to terminal spacing may be dictated by the particular dimensions of the components stocked for manufacture of modules, for example, the side sections 1650 and 1660 described above. Within the dictates of the dimensions of such in-stock components, the present invention, thus, facilitates that modules in multiple form factors can easily and very quickly assembled using a minimum number of such stock components. Such functionality can be used to provide customized low cost modules to end users to fit a particular application "on the fly."

In one embodiment, adjacent voids, for example, voids 502, 503 and 504, 505 . . . may be separated by a distance "Z". In one embodiment, adjacent voids, for example voids 504, 505 may dimensionally overlap each other. It is identified that a corresponding terminal of an appropriately dimensioned cell or device could be coupled to any one of the voids, for example, 501, 502, 503 or 504, 505. Depending on a desired spacing, for example a spacing "M or "N", terminals of the cells or devices could be coupled to different ones of voids 501, 502, 503 or 504, 505, in which case, many different form factor modules could be assembled using only one in stock interconnect. It is identified that such assembly of modules by interconnects may be effectuated using temperature induced expansion or contraction fitting as described above, in which case a radial dimension of the voids 501, 502, 503 or 504, 505, could be provided to be the same or slightly smaller than that of a corresponding device terminal.

In one embodiment, it is identified that an interconnect 500*a*, 500*b* may also find utility in applications other than those that utilize temperature induced expansion or contraction fitting. For example, in an embodiment wherein voids of an interconnect 500*a*, 500*b* comprise a radius that is larger than a corresponding terminal of a device, the interconnects could be coupled to terminals of devices by means of a solder, epoxy adhesive, weld, or other suitable fastening material.

As described previously, a stabilizer 2670 may be formed to comprise a plurality of bus bars 1410. In one embodiment, bus bars 1410 may comprise thermally fitted interconnects as described above. In one embodiment, when a plurality of bus bars 1410 formed within a stabilizer 2670 are heated, expansion of the voids within the bus bars allows the plurality of bus bars to be slipped onto and to be coupled to a plurality of cell terminals in one step without use of solder, epoxy, adhesive, weld, or other fastening material. In this manner, alone, or in combination with other aspects of the invention described herein, cheap, rapid and reliable assembly of interconnected capacitors may achieved.

Electrical connections between the terminals of the cells 1405 and voltage balancing, voltage monitoring, or other electronic components or circuits may be made with wires and/or circuit traces on the stabilizer 2670. In one embodiment, one end of a wire is soldered to an appropriate point of an electronic circuit and the second end of the connecting wire is "staked."

In one embodiment, "staking" of the wire may be performed as follows. A small staking hole is made, e.g., drilled, in a bus bar 1405. The staking hole may be made before or after the bus bar is attached to terminals of a cell 1405. The diameter of the staking hole should be sufficient to receive the conductor of the connecting wire, but generally not be much larger than the conductor. The conductor of the connecting wire is then inserted into the staking hole and held in position while a high impact force is applied to one or more surfaces of the bus bar so as to deform the staking hole, creating a mechanical and electrical "staking" connection between the connecting wire and the bus bar, and preventing the connecting wire from slipping out of the hole. A connecting wire may also be staked directly to small hole made in a terminal of a cell. In this manner, an electrically robust terminal can be effectuated mechanically without the use of solders, adhesives, etc.

In the module embodiments described previously, individual cylindrical cells are arranged side-by-side in one or more rows. In certain other embodiments, a module's cells may be arranged end-to-end, in one or more axially oriented string or column, resulting in configurations of L×M×N cells, where the number L indicates the number of axially aligned cells. It has been identified that certain applications can use long strings of cell more effectively than configurations where the cells are not arranged end-to-end. For example, in an automotive application space may be limited, presenting design difficulties in accommodating a 1×3×6 cell configuration. At the same time, a long string cell configuration, e.g., a 9×1×2, 6×1×2, or 12×1×1 configuration, may be positioned within or along a long hollow frame member, frame pillar member, a hollow roof member, or the like.

Furthermore, it has been identified that by placing a long string of cells within a structural member (for example within a frame member) a further protective shell can be provided around and about cells to protect the cells, such as during an accident. In some embodiments, the modules could be slideably accessible/removable for easy servicing or replacement. In one embodiment, only one end of the cell string (for example a positive end) would be connected by a long heavy-duty cable through which a path for high current that may flow through the cells may be provided. The other end of the cell string could be connected by a short heavy-duty cable, or through the module housing itself, to the frame member, which could then provide a completed path for current flow.

Because a long heavy-duty return path cable need not be used in this embodiment, the weight, cost, and resistance associated with such cable can be eliminated.

Figure 32:
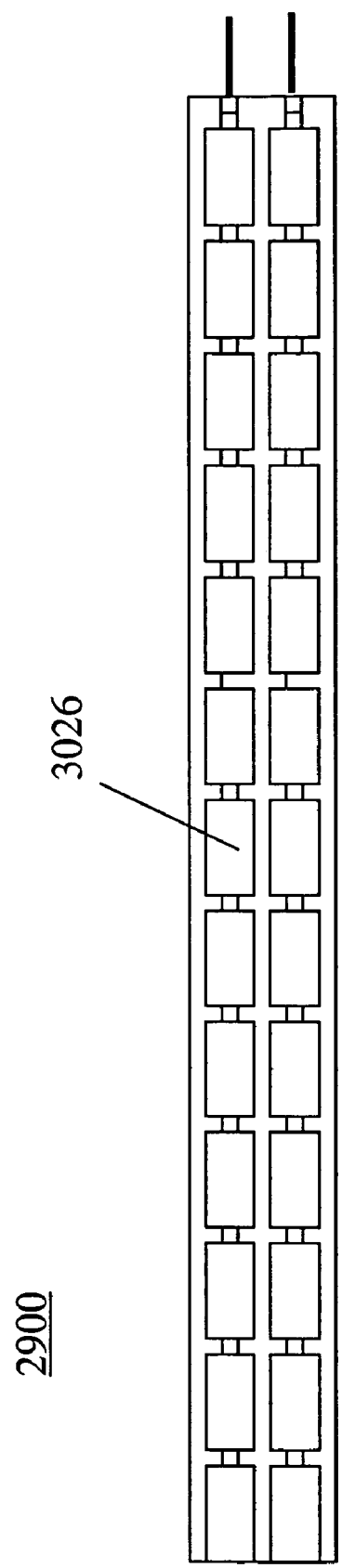
FIG. 32 represents a top view of axially aligned cells within on half of a longitudinal enclosure in accordance with some aspects of the present invention.

FIG. 32 represents a top view of a 13×1×2 module 2900 with its top portion removed, wherein two vertical strings of thirteen cells 2405 are arranged next to each other in a series connection to provide a nominal 65 volt output.

FIG. 33 represents a side view with a longitudinal top 3020 and bottom 3025 portion coupled together to form a sealed module 2900.

FIG. 34 represents a perspective view of module 2900. A front end cover 3010 can be seen at the front of the module 2900. In addition to the front end cover 3010, the module 3010 includes a rear end cover (which is obscured from view in the Figures) at the rear of the module. The top 3020 and bottom 3025 portions are joined together along side flanges 3030. The longitudinal pieces 3020 and 3025 may be joined together using nuts and bolts inserted through holes in the side flanges 3030. In some alternative embodiments, the longitudinal pieces 3020 and 3025 may be joined using tongue and groove connectors, or other fasteners. The longitudinal pieces 3020/3025 may be cut to length as needed from a longer extruded piece with appropriate cross-section. One base extruded piece may thus be used to make the enclosure for accommodating any string length of cells.

In one embodiment, longitudinal pieces 3020 and 3025 comprise longitudinally positioned slots which may be used to slideably receive a printed circuit board with one or more voltage monitoring circuits, voltage balancing circuits, temperature monitoring circuits, and/or other electronic circuits used in the module 2900. FIG. 30 represents a circuit 3026 positioned within a slot of a bottom portion.

Figure 35:
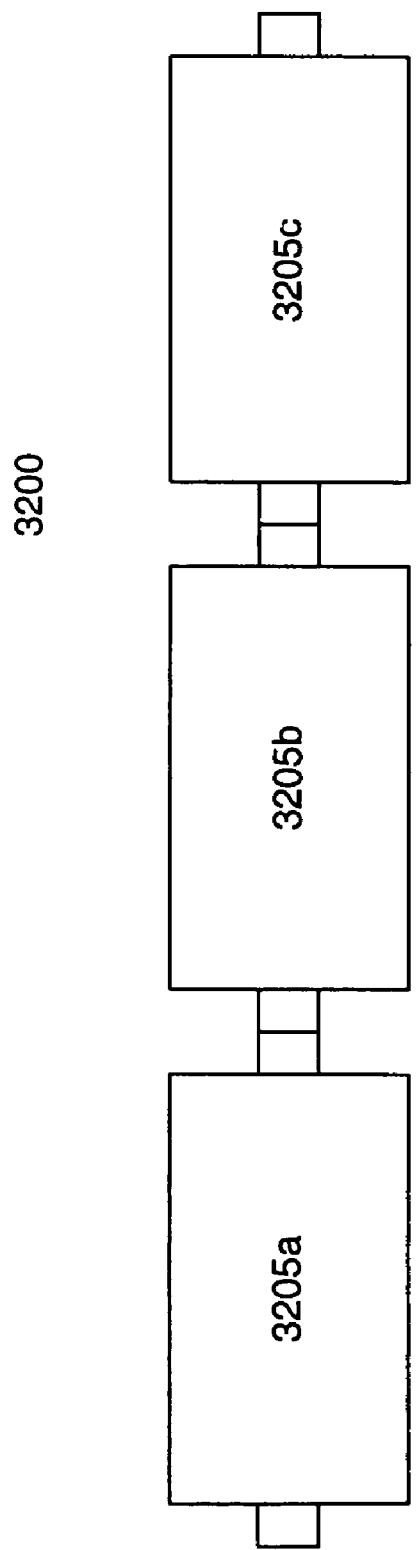
FIG. 35 represents an axial string of 3 series connected capacitors.

FIG. 35 represents a single axial string 3200 of six capacitor cells 3205a-3205c. The cells 3205 may be joined together in various ways. In some embodiments, the cell terminals may be threaded in a complimentary manner. For example, one terminal of each cell 3205 may be threaded as a bolt, while the opposite terminal may appropriately dimensioned and threaded as a matching nut, or vice versa. The cells 3205 may then be screwed into each other to obtain the vertical string 3200.

Figure 36:
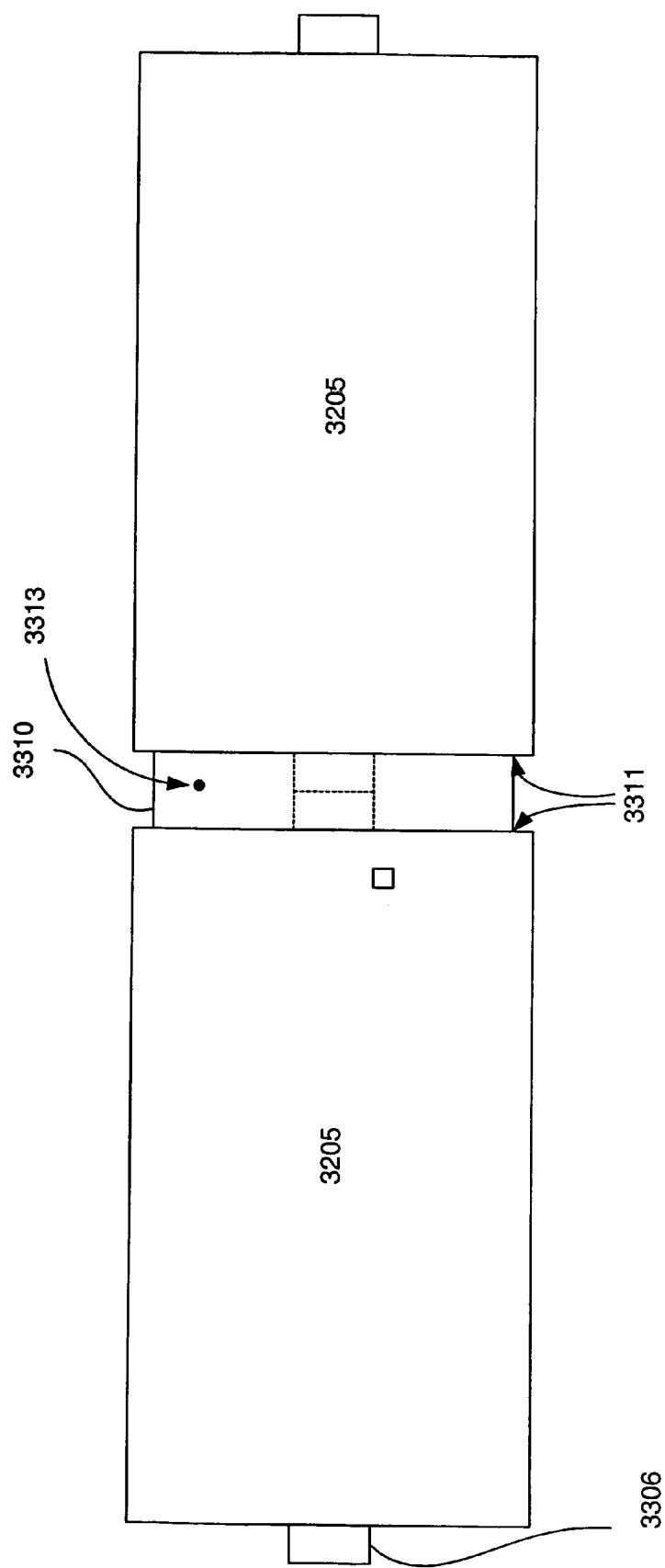
FIG. 36 represents two capacitor interconnected by an interconnect.

In FIG. 36 there is represented two cells 3205, each comprising two extending terminal stubs 3306. In one embodiment, two adjacent cells 3205 can be joined in a vertical string by an element 3310 placed therebetween. In one embodiment, the element is shaped generally as a circular washer. Terminal stubs 3306 of adjacent cells 3205 can preferably be placed within a void formed within the element 3310 such that the adjacent cells 3205 abut near to or against the element. The element 3310 can subsequently be welded to the cells 3205 at one or more points about its periphery 3311. In one embodiment, welding is performed using a laser.

According to aspects of previous descriptions provided herein, in one embodiment, element 3310 may be dimensioned with a centrally disposed void that is the same or slightly smaller in diameter than the terminal stubs 3306. In one embodiment, during or after the element 3310 is heated, terminals of two cells 3205 may be slideably inserted into the void. After cooling of the element, the two cells may preferably be mechanically and electrically interconnected by the element 3310 such that subsequent welding or other material is not necessary to ensure that a strong self-supporting connection is made therebetween.

Although longitudinal strings of capacitors are described to be coupled by a bus bar or interconnect shaped as a washer, for example, a disk with a centrally disposed hole or apertures formed therein, it is understood that other shapes are within the scope of the invention, for example an element 3310 in other embodiments could comprise an elliptical, a square, a rectangular, or other geometry with one or more void formed therein.

In another embodiment, an element 3310 may comprise two opposingly disposed voids, wherein the voids are formed within an element 3310 on opposite sides, but are separated by some portion of element 3310 (not shown).

FIG. 34 represents two cells 3205 coupled by an intermediate element 3310; the vertical string can be extended to any length in the manner described to effectuate a low resistance and strong interconnection of a long series string of cells. The vertical string can be integrated into a module 2900 described above, or, because it can be self-supporting, by itself in a particular application allowing such use. FIG. 34 also shows a staking hole 3313 on the side of the washer 3310. The staking hole 3313 may be used for attaching a connecting wire to the terminal using the staking process described above.

This document describes the inventive cells, cell modules, interconnects, and fabrication processes of the cells and the modules in considerable detail. This was done for illustration purposes. Neither the specific embodiments of the invention as a whole, nor those of its features, limit the general principles underlying the invention. The specific features described herein may be used in some embodiments, but not in others, without departure from the spirit and scope of the invention as set forth. Many additional modifications are intended in the foregoing disclosure, and it will be appreciated by those of ordinary skill in the art that, in some instances, some features of the invention will be employed in the absence of a corresponding use of other features. The illustrative examples therefore do not define the metes and bounds of the invention and the legal protection afforded the invention.

What is claimed is:

1. A method of using an interconnect, comprising:
providing an energy storage device, the device including a terminal having a first distance;
providing an interconnect, the interconnect including a void having a surface defined by a second distance;
subjecting the terminal and the interconnect to different temperatures;
positioning the terminal within the void; and
allowing the terminal and the interconnect to equilibrate to substantially the same temperature to form a bond between the surface and the terminal.

2. The method of claim 1, wherein before subjecting the terminal and the interconnect to different temperatures, and before positioning the terminal within the void, at the same temperature the first distance is shorter than the second distance.

3. The method of claim 2, wherein the device comprises a capacitor.

4. The method of claim 1, wherein at the same temperature, the device, the terminal, and the interconnect comprise a self-supporting assembly.

5. The method of claim 1, further comprising passing at least 1000 amps of current through the terminal and the interconnect.

* * * * *